(12) United States Patent
Carraro et al.

(10) Patent No.: US 11,897,378 B2
(45) Date of Patent: Feb. 13, 2024

(54) VENTILATED MOLDED COVERS FOR SEATING APPLICATIONS

(71) Applicants: Magna Seating Inc., Aurora (CA); Bruno D Carraro, Ferndale, MI (US); Eric Kozlowski, Oakland Township, MI (US); Craig Prasatek, Rochester, MI (US); Cynthia Puchalski, Rochester, MI (US)

(72) Inventors: Bruno D Carraro, Ferndale, MI (US); Eric Kozlowski, Oakland Township, MI (US); Craig Prasatek, Rochester, MI (US); Cynthia Puchalski, Rochester, MI (US)

(73) Assignee: Magna Seating Inc., Aurora (CA)

( * ) Notice: Subject to any disclaimer, the term of this patent is extended or adjusted under 35 U.S.C. 154(b) by 479 days.

(21) Appl. No.: 17/311,504

(22) PCT Filed: Dec. 4, 2019

(86) PCT No.: PCT/US2019/064432
§ 371 (c)(1),
(2) Date: Jun. 7, 2021

(87) PCT Pub. No.: WO2020/117915
PCT Pub. Date: Jun. 11, 2020

(65) Prior Publication Data
US 2022/0017003 A1 Jan. 20, 2022

Related U.S. Application Data

(60) Provisional application No. 62/775,944, filed on Dec. 6, 2018.

(51) Int. Cl.
*B60N 2/58* (2006.01)
*B29C 51/14* (2006.01)
(Continued)

(52) U.S. Cl.
CPC .......... *B60N 2/5891* (2013.01); *B29C 51/145* (2013.01); *B32B 3/263* (2013.01);
(Continued)

(58) Field of Classification Search
CPC .......... B32B 3/263; B32B 7/14; B32B 5/245; B32B 27/065; B32B 27/12; B32B 27/40;
(Continued)

(56) References Cited

U.S. PATENT DOCUMENTS

| 5,597,200 A | 1/1997 | Gregory et al. | |
| 6,869,139 B2 * | 3/2005 | Brennan | B60N 2/5657 297/180.12 |

(Continued)

FOREIGN PATENT DOCUMENTS

| CN | 103459204 | 12/2013 |
| EP | 2939828 | 11/2015 |

*Primary Examiner* — Milton Nelson, Jr.
(74) *Attorney, Agent, or Firm* — Miller Canfield

(57) ABSTRACT

A ventilated molded seat trim cover for a vehicle seat and a ventilated vehicle seat having a ventilated molded seat trim cover, comprising a stacked assembly of an upper textile layer, a first adhesive layer, an air permeable polyurethane cellular foam interlayer thermo-moldable at temperatures between about 104° C. and about 127° C., a second adhesive layer, a thermoplastic polyurethane (TPU) film, a third adhesive layer, and a scrim backing layer. The stacked assembly is compression molded in a 3-dimensional mold while at least a portion of the foam interlayer is heated to a temperature between about 104° C. and about 127° C. to form the ventilated molded seat trim cover. The TPU film prevents airflow passing through a bottom surface of the seat trim cover. Airflow in the foam interlayer can pass through the upper textile layer.

30 Claims, 16 Drawing Sheets

(51) Int. Cl.
  *B32B 3/26*   (2006.01)
  *B32B 5/24*   (2006.01)
  *B32B 7/14*   (2006.01)
  *B32B 27/06*  (2006.01)
  *B32B 27/12*  (2006.01)
  *B32B 27/40*  (2006.01)
  *B32B 37/10*  (2006.01)
  *B60N 2/56*   (2006.01)
  *B29L 31/58*  (2006.01)

(52) U.S. Cl.
  CPC ............... *B32B 5/245* (2013.01); *B32B 7/14* (2013.01); *B32B 27/065* (2013.01); *B32B 27/12* (2013.01); *B32B 27/40* (2013.01); *B32B 37/10* (2013.01); *B60N 2/5635* (2013.01); *B60N 2/5657* (2013.01); *B29L 2031/58* (2013.01); *B32B 2307/738* (2013.01); *B32B 2605/003* (2013.01)

(58) Field of Classification Search
  CPC .............. B32B 37/10; B32B 2307/738; B32B 2605/003; B29C 51/145; B60N 2/5657; B60N 2/5891; B29L 2031/58
  USPC ...................................................... 297/180.1
  See application file for complete search history.

(56) References Cited

U.S. PATENT DOCUMENTS

| | | | |
|---|---|---|---|
| 7,040,710 B2* | 5/2006 | White | B60N 2/5657 297/452.42 |
| 7,114,771 B2 | 10/2006 | Lofy et al. | |
| 7,131,689 B2 | 11/2006 | Brennan et al. | |
| 7,370,911 B2 | 5/2008 | Bajic et al. | |
| 8,820,829 B2 | 9/2014 | Uebelacker | |
| 2005/0025954 A1 | 2/2005 | Sullivan, Jr. et al. | |
| 2013/0161998 A1 | 6/2013 | Uebelacker et al. | |
| 2014/0346820 A1 | 11/2014 | Brandt et al. | |

* cited by examiner

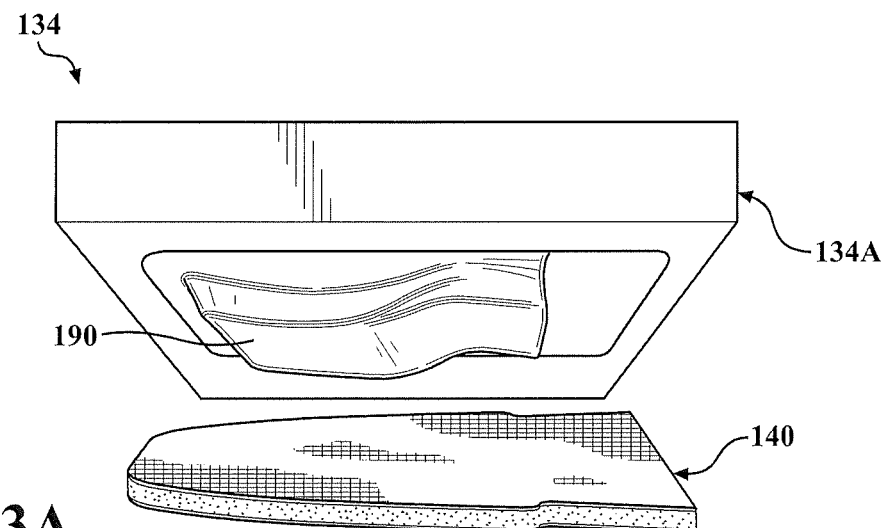
FIG. 13A
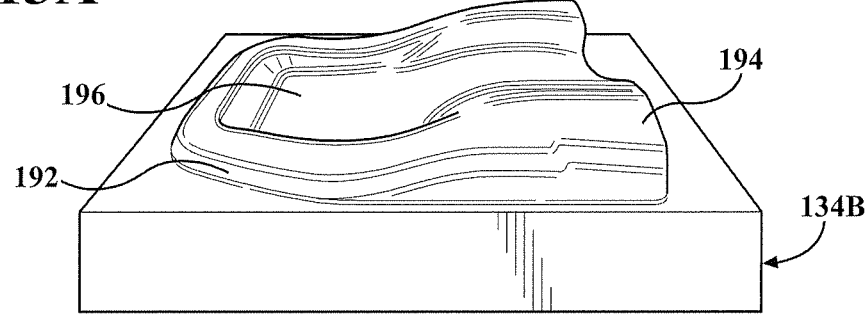
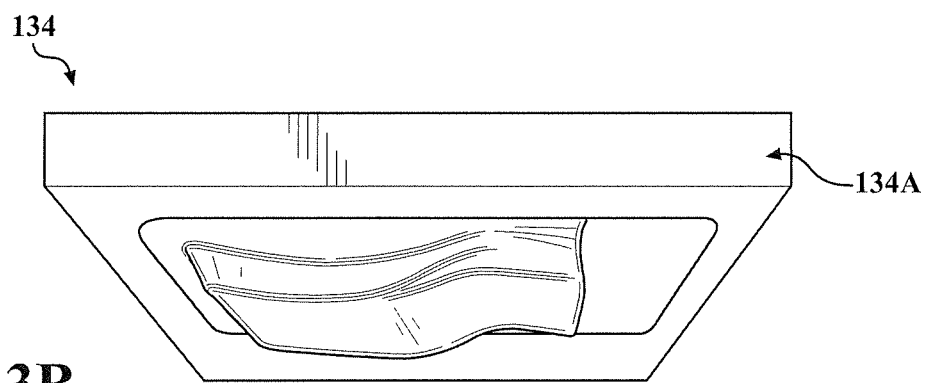
FIG. 13B
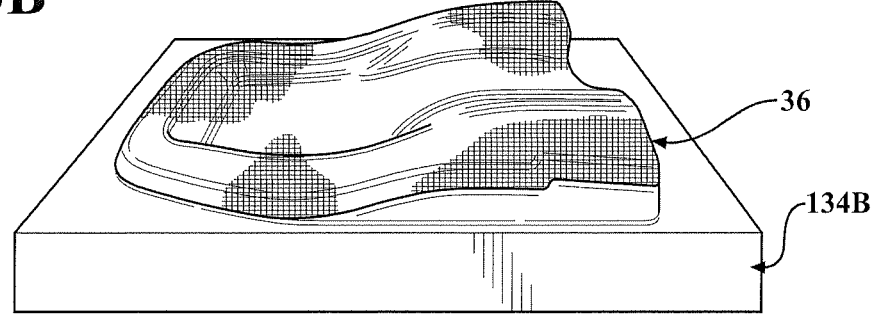

VENTILATED MOLDED COVERS FOR SEATING APPLICATIONS

CROSS-REFERENCE TO RELATED APPLICATIONS

This application claims priority to U.S. Provisional Application No. 62/775,944, filed on Dec. 6, 2018, the disclosure of which is hereby incorporated by reference in its entirety.

BACKGROUND OF THE INVENTION

1. Field of the Invention

The present invention relates to a process for molding ventilated trim covers for vehicle seats and the ventilated trim covers formed using this molding process. More particularly, the invention relates to a process for forming 3-dimensional ventilated trim covers and vehicle seats having 3-dimensional ventilated trim covers.

2. Description of Related Art

Automotive vehicles typically include one or more seat assemblies having a seat cushion and a seat back for supporting a passenger above a vehicle floor. Generally, each of the seat cushion and seat back comprise a base foam pad supported by a frame. A seat trim cover and optionally additional layers of foam and/or padding are assembled with the base foam pad to provide a finished surface. Each of the seat cushion and seat back generally have one or more contoured surfaces and generally require a contoured trim cover. The contoured cover generally comprises a seating surface portion (referred to hereafter as a trim cover panel or trim cover) fastened and/or sewn to one or more side pieces.

Certain automotive seat assemblies include ventilation through the trim cover for occupant comfort. This ventilation can be combined with a forced air system as well as a heating and/or a cooling system depending on a desired vehicle seat configuration. The vehicle seat optionally includes a fan configured to force airflow through an airflow passageway in the base foam pad, through any intermediary layers of foam and/or padding, and through the trim cover. Alternatively, the fan draws air through the trim cover, through any intermediary layers of foam and/or padding, through the air passageway in the base foam pad, and towards the fan.

One known ventilated vehicle seat cushion is disclosed in U.S. Pat. No. 8,820,829. This known ventilated vehicle seat cushion is generally formed by adhering a fabric cover material to a carrier layer of open-pored cut foam, applying a barrier coat of polyurethane film in selected areas of the carrier layer, placing the assembly of the cover material, the carrier layer, and barrier coat within a foam forming tool, and filling the foam forming tool with reaction mixture to cold foam a main pad having airflow channels. When the seat cushion is assembled into a vehicle seat, airflow passes through the airflow channels in the pad, through holes in the barrier coat, into the carrier layer, and through the fabric cover material. While this method includes a molded seating surface, the seating surface is not removable from the main pad since the main pad is cold foamed with the cover material and the carrier layer.

Another commonly known ventilated vehicle seat is constructed using a plenum bag as described in U.S. Pat. No. 7,114,771. The plenum bag generally comprises upper and lower layers of air-impermeable film with edges sealed forming a bag. This known ventilated seat comprises a perforated cover material assembled with an air-permeable foam layer, a plenum bag having air passageways to pass airflow between the plenum bag and the air-permeable foam layer, and a foam pad having an airflow passageway passing through the foam pad configured to pass airflow into the plenum bag. The plenum bag allows for the use of an assortment of methods of forming a trim cover for the vehicle seat since the trim cover is typically fastened, adhered, and otherwise assembled and/or formed with the foam pad. However, it is desirable to include the function of the plenum bag within a compression molded trim cover such that a separate plenum bag is not required.

A known compression molding process for forming trim covers, developed by Actex, Inc., is disclosed in U.S. Pat. No. 4,867,826. The Actex method generally comprises the steps of applying a heat-curable urethane adhesive to one surface of a compressible polyurethane foam layer, directly contacting an upper textile material to the adhesive layer to form a bilayer, placing the bilayer on a platen, contacting the upper textile material layer of the bilayer with at least one heated projection of a mold tool at a temperature from about 150° C. to about 250° C. (about 300° F. to about 480° F.), compressing regions of the foam layer adjacent the heated projection while melting and collapsing the compressed regions of the foam layer using the heat of the projection to form permanent embossed lines in the bilayer. As well having limited amounts of molded surface contour, the Actex method lacks the function of a plenum bag within the finished trim cover. Further, the elevated molding temperatures required to melt and collapse compressed regions of the foam layer limit the selection of upper textile materials.

It is desirable, therefore, to form a molded ventilated trim cover for a vehicle seat with an integrated airflow path eliminating the need for a plenum bag. An additional benefit is having a molded ventilated trim cover that is breathable in desired locations to enhance air flow. Further, it is desirable to have a ventilated trim cover that is releasably fastened to a base foam pad since the seat trim cover can be interchanged as needed, without having to replace additional components of the vehicle seat. It is also desirable to form a trim cover utilizing a cellular polyurethane foam that is compression moldable in a temperature range of about 104° C. to about 127° C. (about 220° F. to about 260° F.), allowing for the use of an expanded range of cover materials. Finally, it is desirable to insert mold a plastic bracket and/or other attachment components within the finished trim cover to provide support to attach a fan and/or one or more air ducts.

SUMMARY OF THE INVENTION

A ventilated molded seat trim cover for a vehicle seat. Comprises a stacked assembly of an upper textile layer, a first adhesive layer, an air permeable polyurethane cellular foam interlayer thermo-moldable at temperatures between about 104° C. and about 127° C., a second adhesive layer, a thermoplastic polyurethane (TPU) film, a third adhesive layer, and a scrim backing layer. The stacked assembly is compression molded in a 3-dimensional mold while at least a portion of the foam interlayer is heated to a temperature between about 104° C. and about 127° C. to form the ventilated molded seat trim cover. The TPU film prevents airflow passing through a bottom surface of the trim cover.

Airflow in the foam interlayer can pass through the upper textile layer and towards an external environment above the trim cover.

BRIEF DESCRIPTION OF THE DRAWINGS

Advantages of the present invention will be readily appreciated as the same becomes better understood by reference to the following detailed description when considered in connection with the accompanying drawings wherein:

FIG. 13A illustrates a perspective view of the laminate blank of FIG. 11 inserted between a lower mold tool surface and an upper mold tool surface, according to an embodiment of the present invention;

FIG. 13B illustrates a perspective view of the laminate blank of FIG. 11 and the mold tools of FIG. 13A after a compression molding process, according to an embodiment of the present invention;

DETAILED DESCRIPTION OF THE EMBODIMENTS

FIGS. 1-7 and 9-18 illustrate molded ventilated vehicle seat trim covers, vehicle seats having molded ventilated trim covers, and a process for manufacturing the ventilated seat trim covers according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Further, the Figures are not necessarily shown to scale. Referring to the Figures, like numerals indicate like or corresponding parts throughout the several views.

Figure 1A:
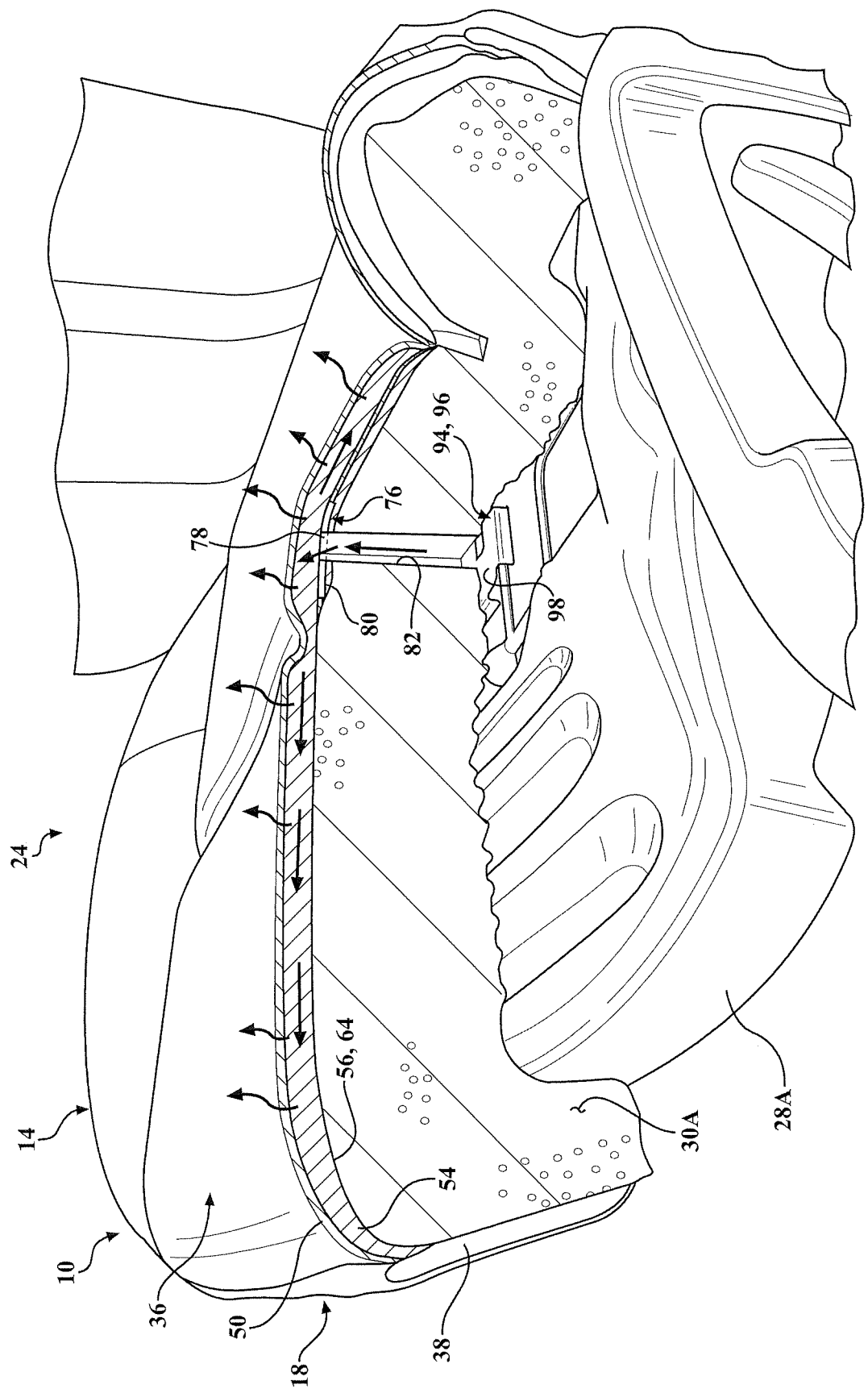
FIG. 1A illustrates a cut-away perspective view of a vehicle seat having a molded ventilated seat trim cover with airflow exhausting through a seating surface, according to an embodiment of the present invention.
Figure 1B:
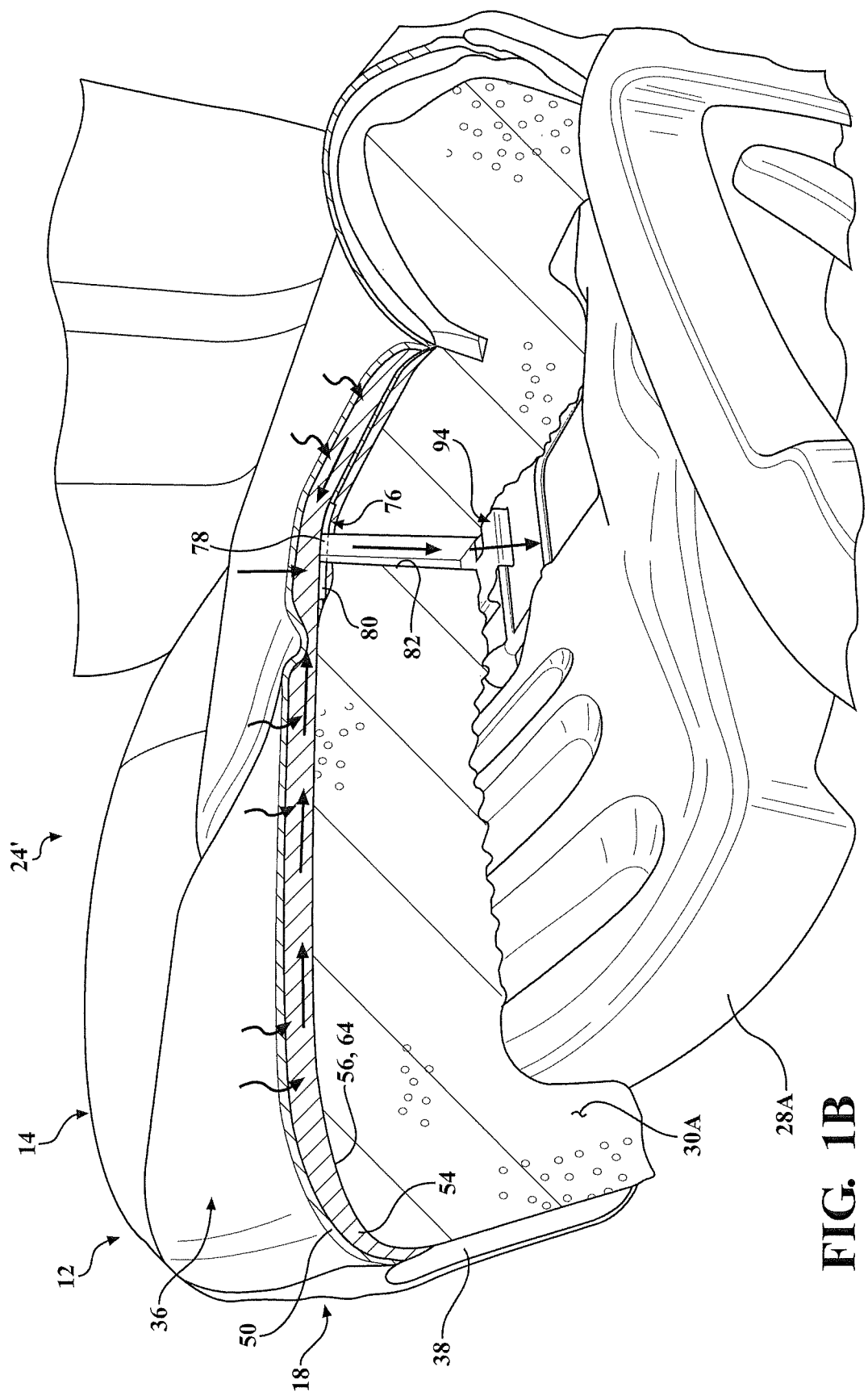
FIG. 1B illustrates a cut-away perspective view of a vehicle seat having a molded ventilated seat trim cover with airflow entering through a seating surface, according to another embodiment of the present invention.
Figure 2:
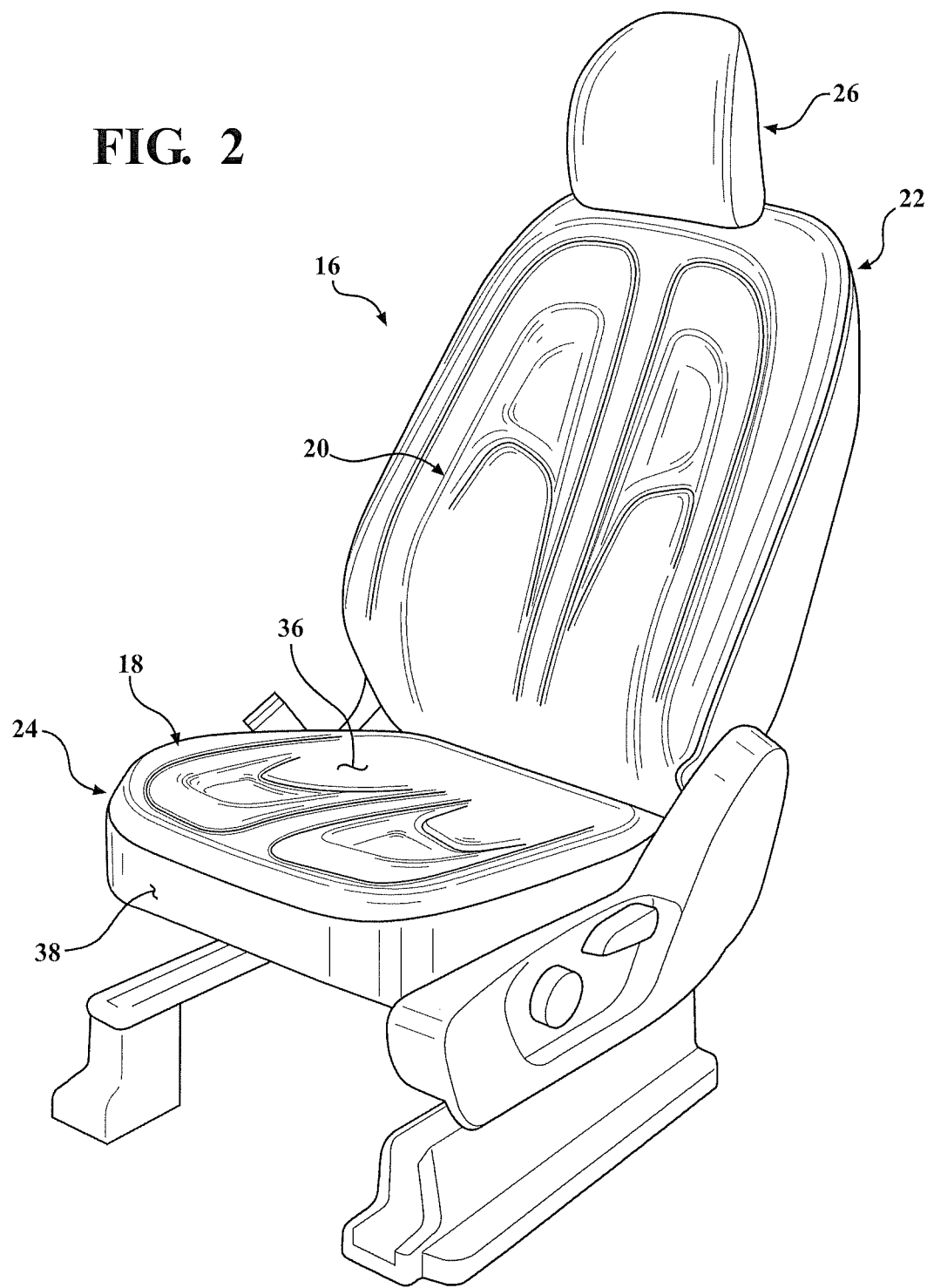
FIG. 2 illustrates a perspective view of a vehicle seat having a molded ventilated seat cushion trim cover and a molded ventilated seat back trim cover, according to an embodiment of the present invention.
Figure 3:
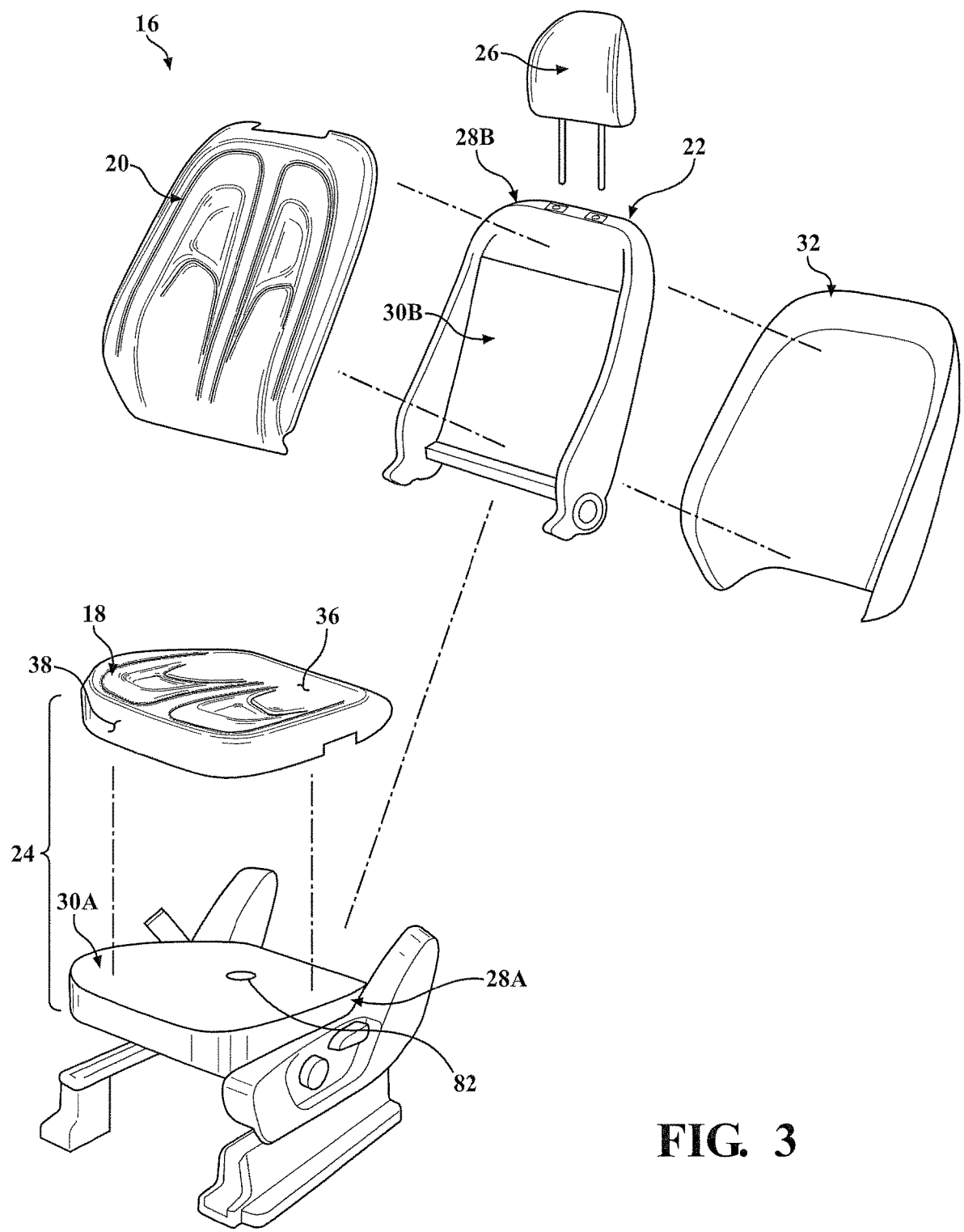
FIG. 3 illustrates an exploded view of the vehicle seat of FIG. 2, according to an embodiment of the present invention.

FIGS. 1A and 1B illustrate cut-away perspective views of a cooling vehicle seat cushion assembly 10 and a ventilated vehicle seat cushion assembly 12, respectively, having ventilated molded trim covers 14 according to embodiments of the present invention. Ventilated trim covers 14 assembled and compression-molded by way of a process disclosed herein are optionally described as FreeForm™ ventilated trim covers 14. FIG. 2 shows a perspective view of a vehicle seat assembly 16 having a ventilated seat cushion trim cover assembly 18 and a ventilated seat back trim cover assembly 20. FIG. 3 shows an exploded view of the vehicle seat 16 of FIG. 2. As shown in FIGS. 2 and 3, the vehicle seat 16 includes a seat back 22 rotatably connected to a seat cushion 24 and a head restraint 26 coupled with the seat back 22. As shown in FIG. 3, each of the seat cushion 24 and the seat back 22 includes a frame 28A, 28B for supporting a molded base foam pad 30A, 30B. The seat cushion 24 and optionally the seat back 22 are covered with molded ventilated trim cover assemblies 18, 20. The seat back 22 includes a seat back trim cover 32. Each ventilated trim cover assembly 18, 20 comprises a molded seat trim cover 36 optionally sewn or assembled with one or more side pieces 38 to form the trim cover assembly 18, 20. As shown in FIG. 1A, a seat cushion trim cover assembly 18 is assembled with the base foam pad 30A to form the seat cushion 24. The seat cushion trim cover assembly 18 and/or the seat back trim cover assembly 20 may include integrated ventilation as desired for a specific application.

The present invention relates to molded ventilated seat trim covers 36 having an integrated airflow path for vehicle seats 16. More specifically, the disclosed molded ventilated seat trim covers 36 have an improved appearance, a reduction in required sew seams, releasable attachment to the vehicle seat, and improved breathability over traditional molded trim covers. Further, the disclosed molded ventilated seat trim covers 36 include an integrated airflow path eliminating the need for a plenum bag.

Figure 4:
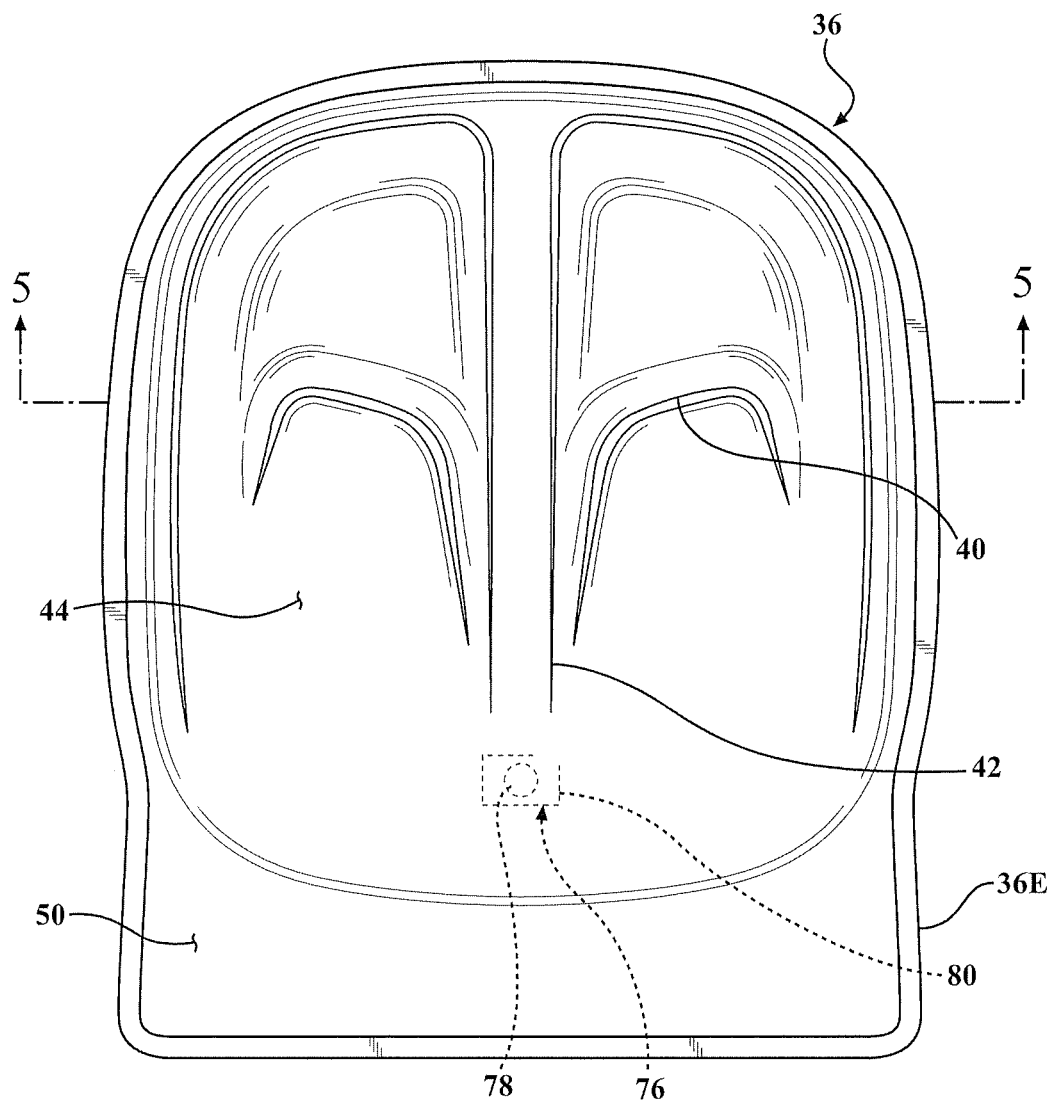
FIG. 4 illustrates a top view of a molded ventilated seat trim cover according to an embodiment of the present invention.
Figure 5:
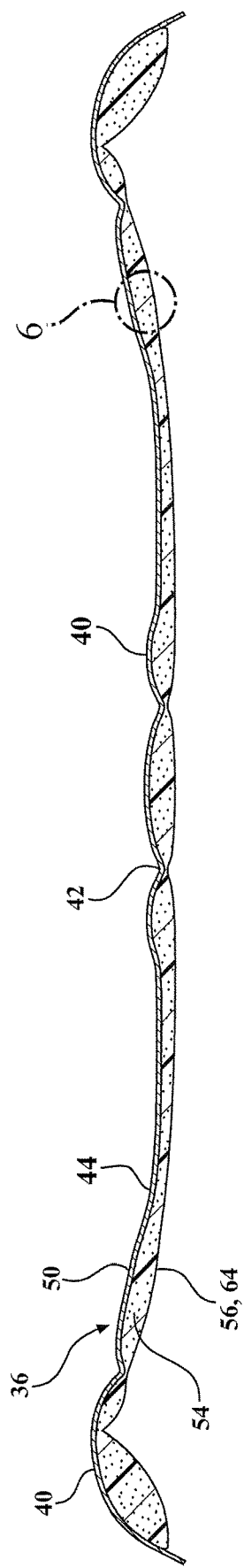
FIG. 5 illustrates a cross-sectional view of the molded ventilated seat trim cover of FIG. 4 taken along section line 5-5 shown in FIG. 4, according to an embodiment of the present invention.
Figure 6:
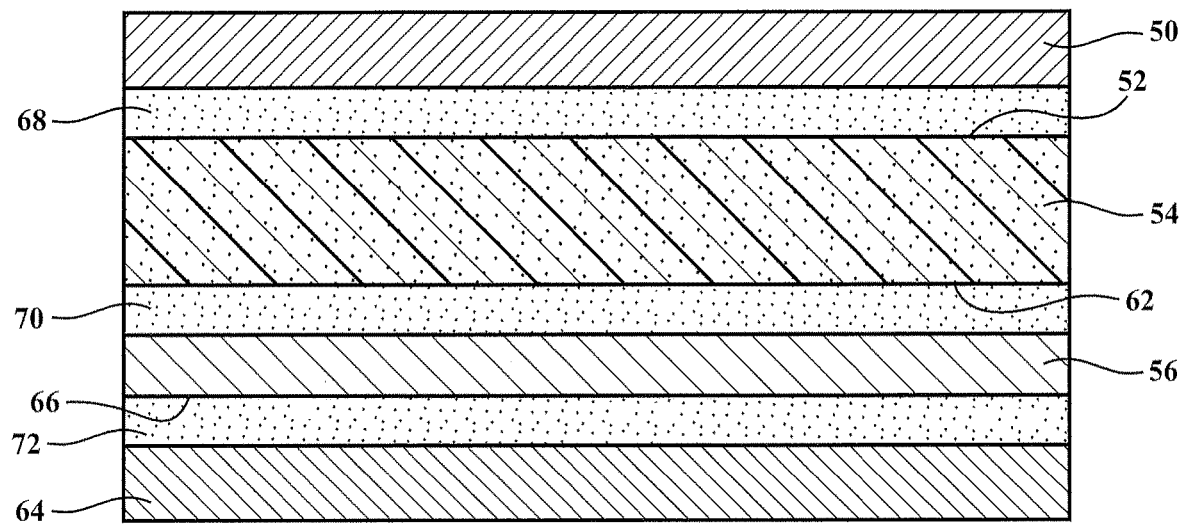
FIG. 6 illustrates an enlarged view of portion 6 of the cross-sectional view of the molded ventilated seat trim cover of FIG. 5, according to an embodiment of the present invention.

An embodiment of a FreeForm™ ventilated molded seat trim cover 36, shown in FIG. 4, illustrates molded features 40, molded lines 42 having the appearance of sew seams, surface concavity 44, and a 3-dimensional shape, according to one embodiment of the present invention. A cross-sectional view of the ventilated seat trim cover 36 is shown in FIG. 5. An enlarged portion of the cross-sectional view of the ventilated seat trim cover 36 of FIG. 5 is shown in FIG. 6 illustrating individual layers that make up the molded seat trim cover 36, according to one embodiment of the present invention. While a ventilated seat cushion trim cover 36 is shown in FIGS. 4-6, it will be appreciated that a ventilated seat back trim cover 20 can be similarly constructed as desired for an intended application.

The seat trim cover 36 includes at least an upper textile layer 50 adhered to an upper side 52 of a moldable foam interlayer 54 with a thermoplastic polyurethane (TPU) film 56 adhered to a lower side 62 of the moldable foam interlayer 54, as shown in FIGS. 5 and 6. The TPU film 56 is also described as a "TPU film layer" 56. A scrim backing layer 64, typically a woven or non-woven fabric, is adhered to a lower side 66 of the TPU film 56. The upper textile layer 50 comprises one or more of a fabric, perforated vinyl, and/or perforated leather. Adhesive layers 68, 70, 72 are shown between the upper textile layer 50, the foam interlayer 54, the TPU film 56, and the scrim backing layer 64. Optionally, while not shown in FIG. 6, each seat trim cover 36 may have additional layers such as adhesives, spacer materials, and/or functional elements, such as embedded electronics, support brackets 76, attachment features, and/or seat heaters. It will be appreciated that a variety of materials can be incorporated into the seat trim cover 36 prior to compression molding as suitable or desired for an intended application.

Figure 7:
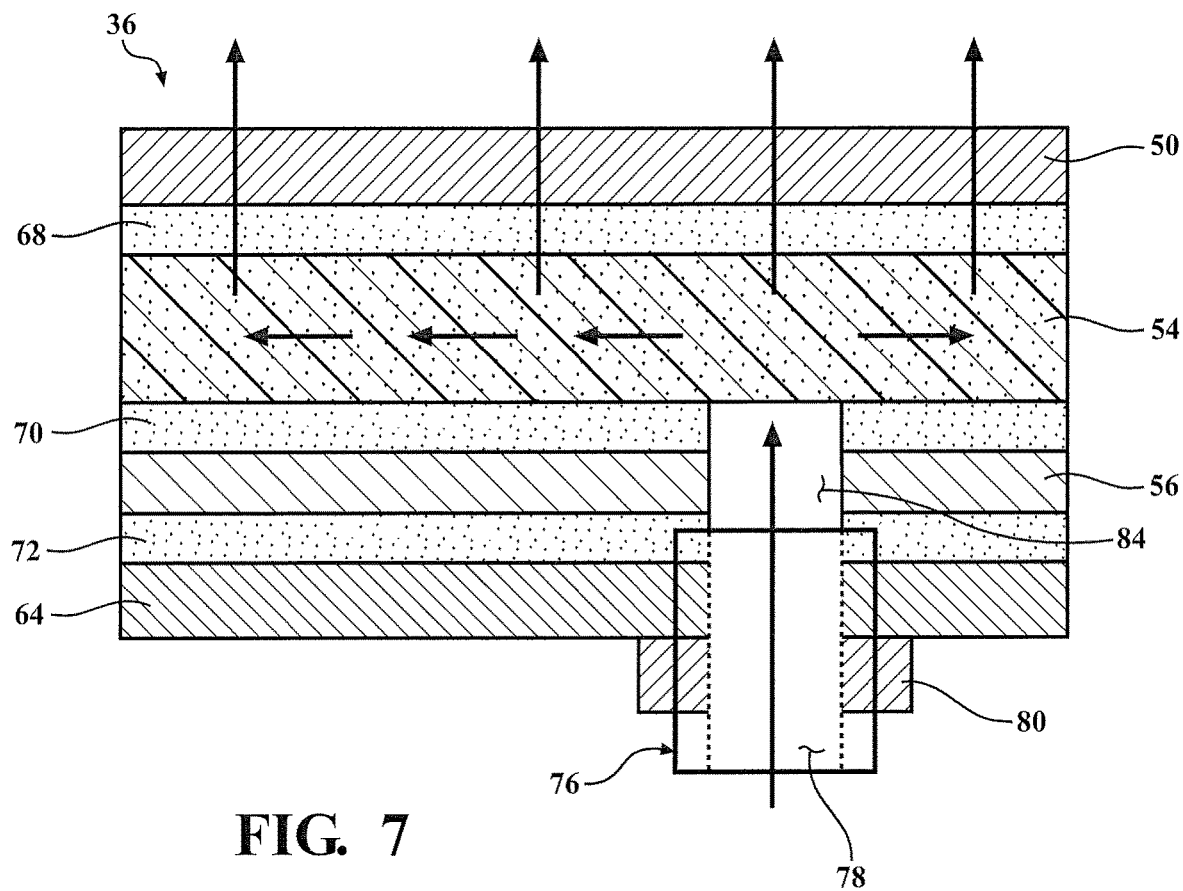
FIG. 7 illustrates airflow through a portion of the ventilated seat trim cover of FIG. 4, according to an embodiment of the present invention.

FIG. 7 illustrates airflow through the ventilated seat trim cover 36 according to one embodiment of the present invention. The foam interlayer 54 is air permeable. The TPU film layer 56 is air-impermeable and may have one or more passageways for passing airflow between the foam interlayer and an external environment adjacent a bottom surface of the ventilated trim cover. When assembled with a base foam pad having an air channel, the one or more passageways in the TPU film are configured to direct airflow from or into the air channel in the base foam pad. In this embodiment, the upper textile layer 50 is adhered to the foam interlayer 54 using flame lamination and/or an adhesive layer 68 such that airflow can pass from the foam interlayer 54, through the adhesive layer 68 (or flame lamination bond), and through the upper textile layer 50. While not shown in the Figures, optional perforations in the upper textile layer 50 may be uniformly distributed across the upper textile layer 50 and/or may be concentrated in selected locations allowing for directed airflow through the upper textile layer 50.

A support bracket 76 including an air passageway 78 and an optional mounting flange 80 can be molded with the ventilated seat trim cover 36 during the compression molding process. The support bracket 76, illustrated in FIGS. 1A and 7, can connect to an air channel 82 in the base foam pad 30A and/or can provide a connection for other components (not shown). The air passageway 78 fluidically connects with a passageway 84 in the TPU film 56 such that airflow through the passageway 78 can pass into the moldable foam interlayer 54. The TPU film 56 prevents airflow through the scrim backing layer 64. The airflow can travel along the foam interlayer 54 since the foam interlayer 54 is air permeable. As shown in FIG. 7, the airflow passes between the foam interlayer 54 and the upper textile layer 50 and exits the seat trim cover 36. Further, while FIG. 7 illustrates the airflow passing from the foam interlayer 54 through the upper textile layer 50, in selected applications the airflow direction can be reversed such that airflow passes through the upper textile layer 50 and enters the foam interlayer 54.

FIGS. 1A and 1B illustrate embodiments of the molded seat trim cover 36 assembled as part of a cooling seat cushion 24 and a ventilated seat cushion 24', respectively. The molded seat trim cover 36 includes the upper textile layer 50, the foam interlayer 54, the TPU film layer 56, and the scrim backing layer 64 as illustrated in the embodiment shown in FIG. 7. Optionally, a support bracket 76 is assembled with the seat trim cover 36 during the compression-molding process to provide an air passageway 78 to the foam interlayer 54. Further, as shown in FIG. 7, the TPU film 56 includes one or more perforations and/or passageways 84 through the TPU film 56 to permit airflow through the TPU film 56 and into the foam interlayer 54.

The molded seat trim cover 36 is assembled with additional side cover pieces 38 to form a trim cover assembly 18, as illustrated in FIG. 1A. The seat trim cover 36 is preferably releasably attached to the foam base pad 30A. The foam base pad 30A includes at least one airflow channel 82 passing through the foam base pad 30A. A fan 94 is fluidly connected to the at least one airflow channel 82 to direct airflow through the airflow channel 82. In the embodiment shown in FIG. 1A, the cooling seat cushion 24 includes a blower 96 with a thermoelectric device 98 to actively cool air up to about 10° C. (about 18° F.) below ambient vehicle air temperature. The blower 96 directs airflow through the airflow channel 82 and into the foam interlayer 54. The airflow travels through the foam interlayer 54 and exits the seat trim cover 36 through the upper textile layer 50.

The embodiment shown in FIG. 1B is similar to the embodiment shown in FIG. 1A. FIG. 1B illustrates a ventilated seat cushion 24'. The ventilated seat cushion 24' includes a fan 94 that pulls air down through an upper textile layer 50 and/or through perforations (not shown) in the upper textile layer 50, through a foam interlayer 54, and through an airflow channel 82 in a foam base pad 30A to reduce humidity and/or moisture within and/or on the ventilated seat cushion 24'. It will be appreciated that various embodiments of airflow paths towards and/or away from the foam interlayer 54 may vary, including configuration and placement of a fan 94, direction of airflow, as well as inclusion of additional features such as cooling and/or heating the upper textile layer 50 without altering the scope of the invention.

Figure 8A:
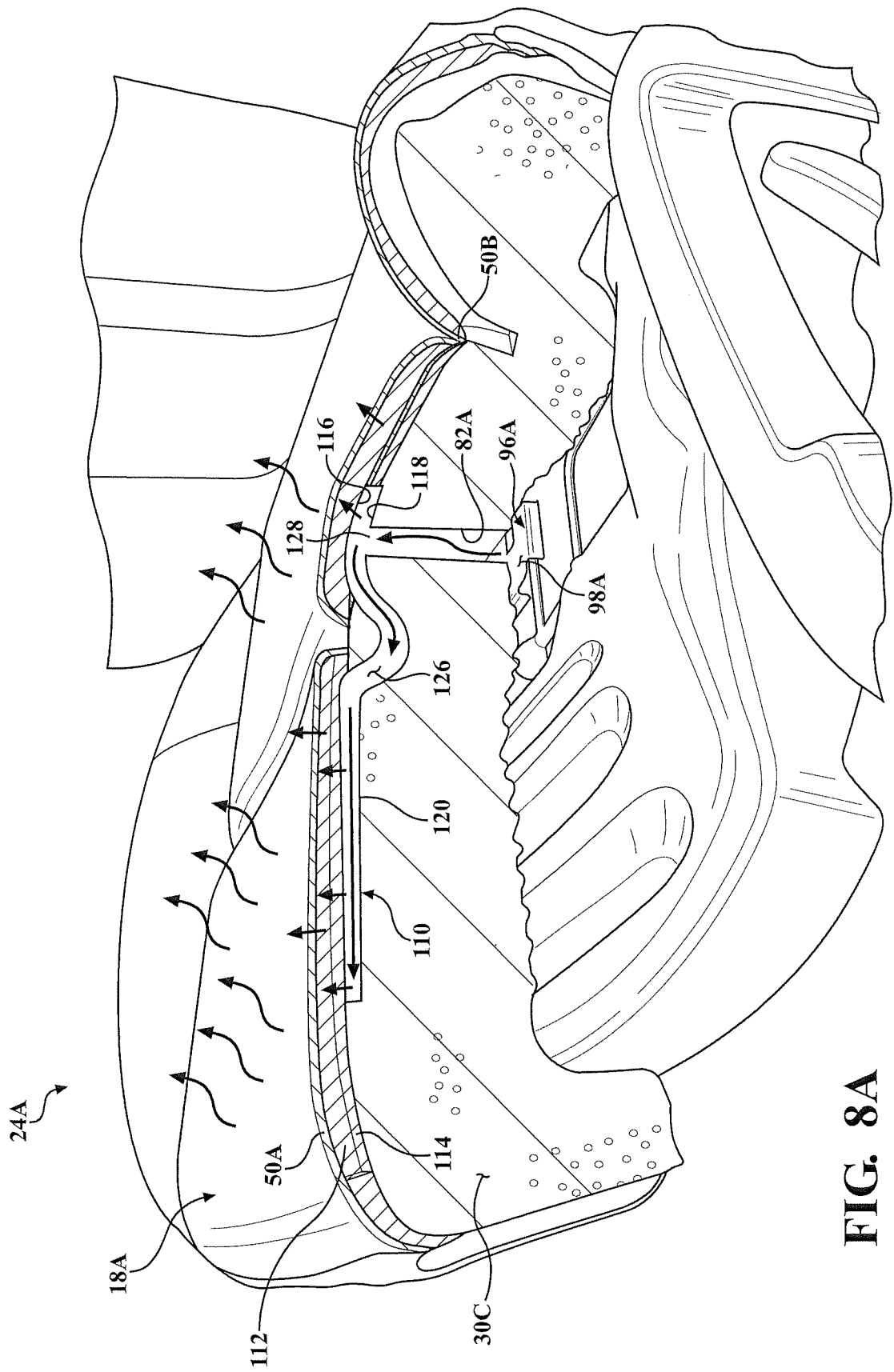
FIG. 8A illustrates a cut-away perspective view of a generally known vehicle seat having a plenum bag between a seat cover and a base foam pad with airflow exhausting through a seating surface.
Figure 8B:
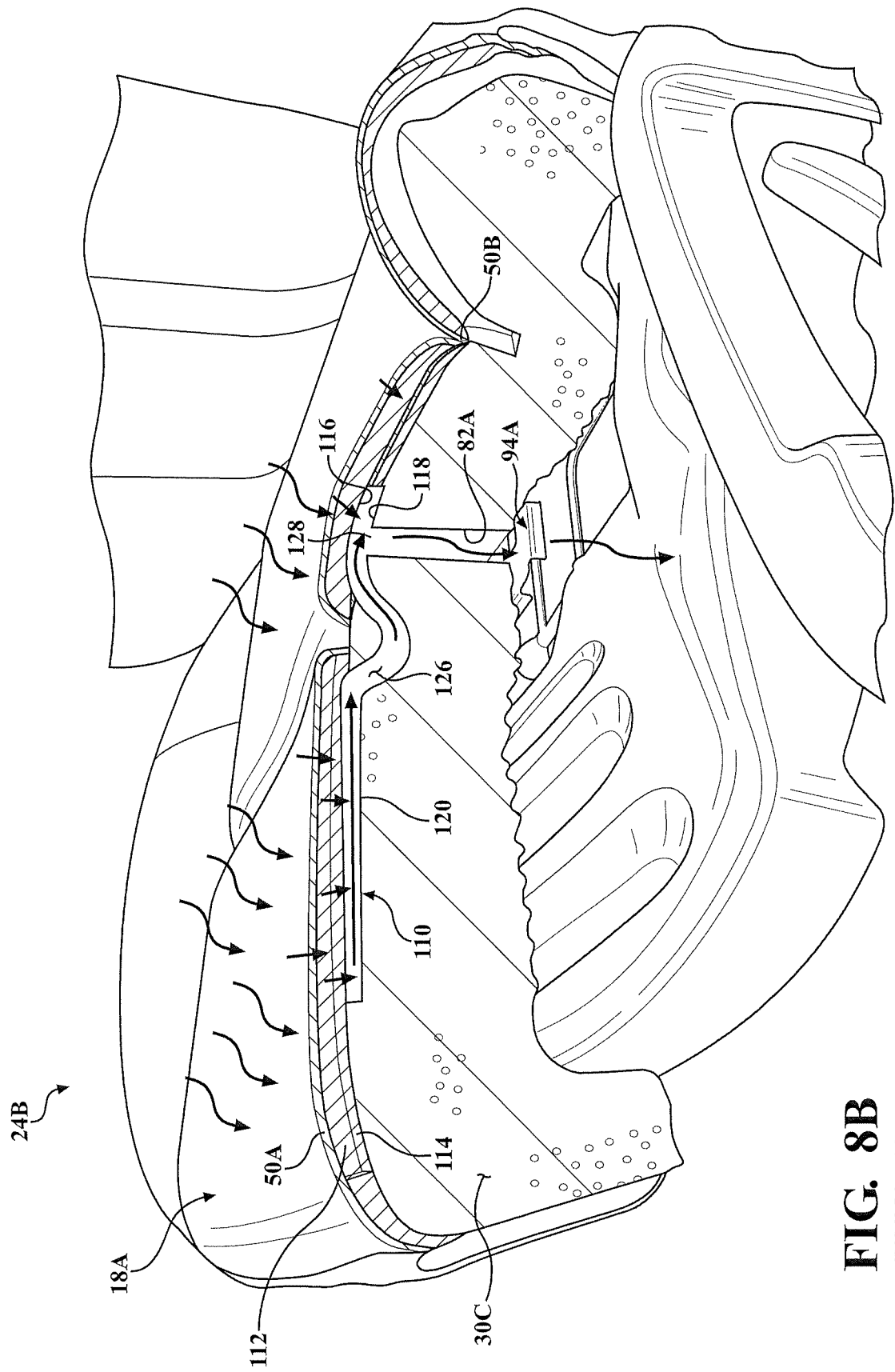
FIG. 8B illustrates a cut-away perspective view of a generally known vehicle seat having a plenum bag between a seat cover and a base foam pad with airflow entering through a seating surface.

Both of the cooling seat cushion 24 and the ventilated seat cushion 24' configurations, illustrated in FIGS. 1A and 1B, respectively, lack a plenum bag 110. Examples of known vehicle seat cushions 24A, 24B illustrating the use of a plenum bag 110 are shown in FIGS. 8A and 8B. The known vehicle seat cushion 24A shown in FIG. 8A includes a cooling function and comprises a perforated leather upper textile layer 50A having cut-and-sew seams 50B, an air permeable spacer fabric (or foam) 112, an air-permeable foam pad 114, a plenum bag 110, a foam base pad 30C having at least one airflow channel 82A, and a blower 96A fluidly coupled to the at least one airflow channel 82A and having a thermoelectric device 98A to actively cool air up to about 10° C. (about 18° F.) below ambient vehicle air temperature. The upper textile layer 50A is part of a trim cover assembly 18A as shown in FIG. 8A.

The plenum bag 110 shown in FIG. 8A comprises upper and lower layers 116, 118 of air-impermeable film 120 spaced apart by a spacer material 126. The two layers 116, 118 of air-impermeable film 120 have sealed edges (not shown) to form the plenum bag 110. The plenum bag 110 includes a port 128 for passing air between the plenum bag 110 and the airflow channel 82A in the base foam pad 30C. The upper layer 116 of the air-impermeable film 120 includes perforations (not shown) to direct airflow through the upper layer 116 of the plenum bag 110 and into the foam pad 114 above the plenum bag 110. In FIG. 8A, the blower 96A forces airflow through the airflow channel 82A in the foam base pad 30C and towards the plenum bag 110. Airflow enters the plenum bag 110 through the port 128 travels along the plenum bag 110. Airflow passes through the perforations in the upper layer 116 of the plenum bag 110 and passes through the air-permeable foam pad 114, through the air-permeable spacer fabric 112, and through the perforations in the upper textile layer 50A.

In contrast to FIG. 8A, FIG. 8B illustrates a known ventilated seat cushion 24B. The known ventilated seat cushion 24B includes similar components as shown in FIG. 8A, i.e., a perforated leather upper textile layer 50A with cut-and-sew seams 50B, an air permeable spacer fabric (or foam) 112, an air-permeable foam pad 114, a plenum bag 110, and a foam base pad 30C having at least one airflow channel 82A. The known ventilated seat cushion 24B includes a fan 94A fluidically connected to the at least one airflow channel 82A in the foam base pad 30C. The fan 94A pulls airflow down through the leather upper textile layer 50A to reduce humidity and/or moisture near and/or adjacent the leather upper textile layer 50A. The fan 94A pulls airflow through perforations (not shown) in the leather upper textile layer 50A, through the air permeable spacer fabric 112, through the air permeable foam pad 114, through perforations (not shown) in an upper layer 116 of the plenum bag 110, through the interior of the plenum bag 110, through a port 128 in the plenum bag 110 and into the airflow channel 82A in the foam base pad 30C, and towards the fan 94A. The fan 94A exhausts the air away from the airflow channel 82A in the foam base pad 30C.

However, both these known vehicle seat cushion configurations 24A, 24B, shown in FIGS. 8A and 8B, respectively, require a plenum bag 110 to distribute airflow between the airflow channel 82A in the foam base pad 30C and the air permeable foam pad 114, the air permeable spacer fabric 112, and the upper textile layer 50A.

While not shown in the Figures, seat trim covers produced using the FreeForm™ process described in W.O. application PCT/US2019/035244, which is hereby incorporated by reference in its entirety, can be used for ventilated seating applications incorporating a plenum bag 110. The Free-Form™ seat trim covers typically include at least an upper textile layer 50 laminated with a thermo-moldable foam interlayer 54 to form a laminate blank (not shown). The foam interlayer 54 is formulated to be moldable in a temperature range of about 104° C. to about 127° C. (about 220° F. to about 260° F.). The laminate blank is placed between 3-dimensional upper and lower mold tools (not shown). The upper and lower mold tools compress the laminate blank at a mold tool compressive pressure (i.e., compressive force) of about 150 psi to about 250 psi while the mold tools are heated to a temperature range of about 65° C. to about 160° C. (about 150° F. to about 320° F.). The FreeForm™ molded seat trim cover assemblies are suitable for use with a plenum bag 110 with the FreeForm™ molded seat trim cover assembly replacing the upper textile layer 50A, the air permeable spacer fabric (or foam) 112, and optionally, the air-permeable foam pad 114 shown in FIG. 8A.

However, including air-impermeable TPU film 56 adjacent and in contact with the foam interlayer 54 prior to compression molding the foam interlayer 54 allows for the elimination of the plenum bag 110 in a cooling and/or ventilated seat cushion 24, 24' if an air passageway 84 is incorporated in the TPU film 56. The disclosed FreeForm™ ventilated seat trim cover 36 eliminates the plenum bag 110 by incorporating an airflow path within the molded seat trim cover 36. The FreeForm™ ventilated seat trim cover 36 and the process for forming this ventilated seat trim cover 36, according to embodiments of the present disclosure, are described below and illustrated in FIGS. 9-18.

While embodiments described below include variations in the composition of layers in the ventilated seat trim cover 36, the molding process generally comprises the placing of the upper textile layer 50, the first adhesive layer 68, the moldable foam interlayer 54, the second adhesive layer 70, at least one layer to TPU film 56, the third adhesive layer 72, and a scrim backing layer 64 within a 3-dimensional mold tool 134 (shown in FIG. 13A) and compression molding the moldable foam interlayer 56 between 3-dimensional upper and lower mold tools 134A, 134B (shown in FIG. 13A). The foam interlayer 54 is formulated to be thermo-moldable in a temperature range of about 104° C. to about 127° C. (about 220° F. to about 260° F.) and is also air permeable. The 3-dimensional mold tools 134 are heated to a temperature range of about 65° C. to about 160° C. (about 150° F. to about 320° F.) to create a temperature gradient in the foam interlayer 54 during the compression molding process. A mold tool pressure of about 150 psi to about 250 psi is used to form the 3-dimensional shaped molded seat trim cover 36. After the compression molding process is complete, the molded seat trim cover 36 is removed from the mold tool 134.

It will be appreciated that the disclosed process may include more or less processing steps, as well as a different sequence of steps, as desired for a specific intended application or manufacturing process. Alternatively, individual layers can be inserted into the mold tool. Further, one or more layers may be pre-assembled as a laminate blank and added to the mold tool along with additional individual layers. Additional components, such as support brackets 76, sensors, heating circuits, and/or mounting hardware as non-limiting examples, can be inserted into the mold tools and/or between layers prior to compression molding the seat trim cover 36 to permanently adhere these components within and/or to the seat trim cover 36. In addition, it will be appreciated that vacuum assist can be added to the molding process if desired for an intended application.

Figure 9:
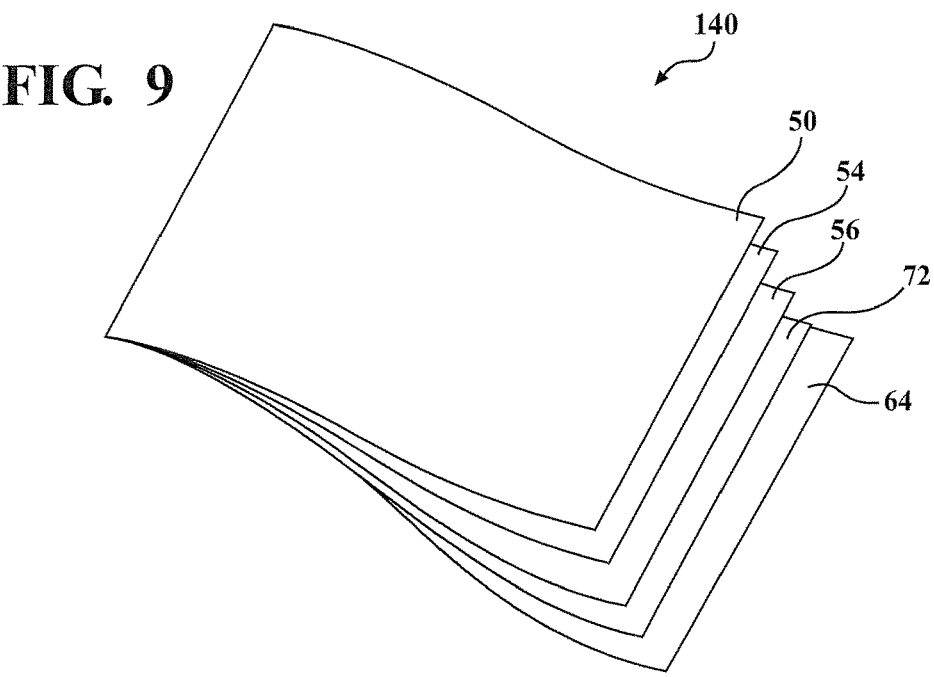
FIG. 9 illustrates a perspective view of layers forming the ventilated seat trim cover, according to an embodiment of the present invention.
Figure 10:
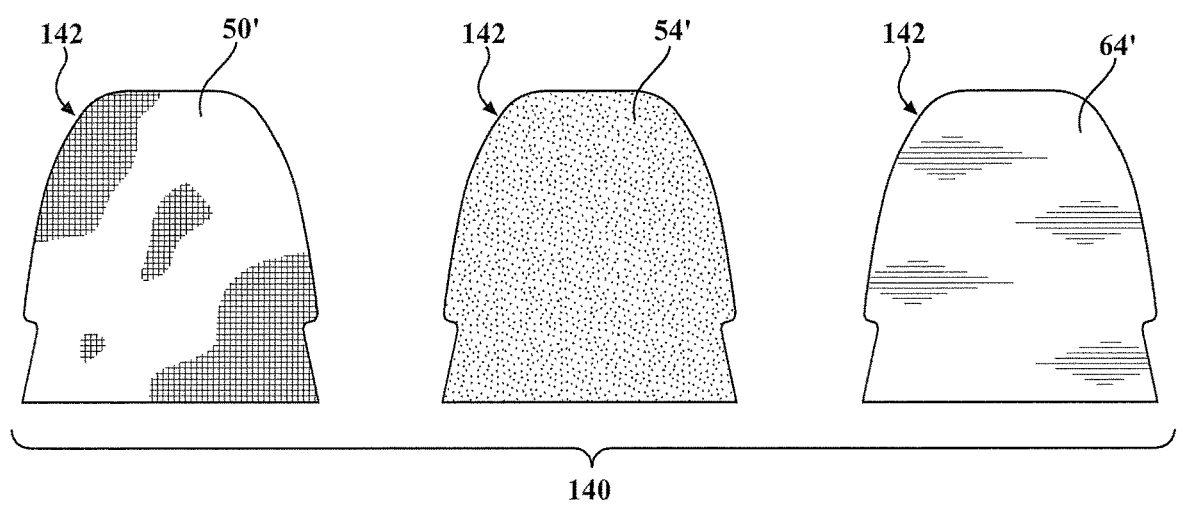
FIG. 10 illustrates a top view of a cover material blank, a moldable foam interlayer blank, and a non-woven scrim backing blank, according to an embodiment of the present invention.
Figure 11:
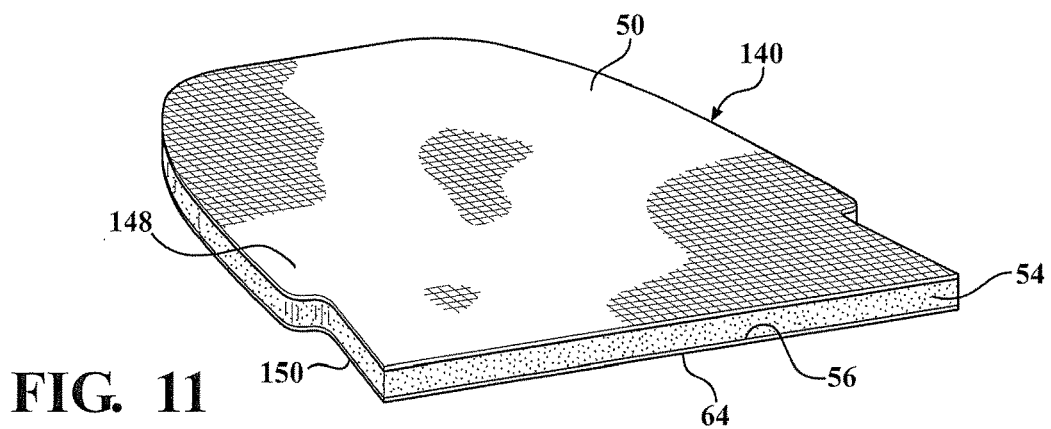
FIG. 11 illustrates a perspective view of a trilaminate assembly [laminate blank], according to an embodiment of the present invention.

One embodiment of this molding process is further illustrated in FIGS. 9-13. Referring to FIG. 9, an upper textile layer 50, a thermo-moldable air permeable foam interlayer 54, a TPU film layer 56, and a scrim backing layer 64 are optionally assembled to form a laminate blank 140, according to one embodiment of the present invention. Also shown is a layer of adhesive 72 between the TPU film layer 56 and the scrim backing layer 64. Further, it will be appreciated that one or more of the upper textile layer 50, the moldable foam interlayer 54, the TPU film layer 56, and the scrim backing layer 64 can be precut into a desired blank shape 142 prior to assembling into the laminate blank 140, as shown in FIGS. 10 and 11. The upper textile layer 50, the foam interlayer 54, and the scrim backing layer 64 can be described as a textile blank 50', a foam interlayer blank 54', and a scrim backing blank 64', respectively, when precut into a desired blank shape 142. While not shown, the TPU film layer 56 can also be precut and may include holes for airflow. Alternatively, one or more of the upper textile layer 50, the moldable foam interlayer 54, the scrim backing layer 64, and additional layers such as TPU film 56, can be assembled and adhered into a laminated assembly 140 prior to cutting the laminate blank 142. Two or more layers of the laminate blank 140 can be assembled in sheet form and cut into the desired blank shape 142 after pre-bonding or pre-attaching the two or more layers. Gerber cutting is an exemplary process to pre-cut the layers into the blank shape 142 and/or cut the laminate blank 140 shape out of two or more assembled layers.

A perspective view of a laminate blank 140 comprising an upper textile layer 50, a foam interlayer 54, a TPU film 56, and a scrim backing layer 64 is illustrated in FIG. 11. The various layers 50, 54, 56, 64 in the laminate blank 140 are adhered and/or flame laminated to an adjacent layer 50, 54, 56, 64.

It will be appreciated that more or less layers may be included in the laminate blank 140 as desired for a particular application. Further, it will be appreciated that additional layers may be added to the laminate blank 140, such as a seat heater (not shown) or additional foam layers (not shown) having a different density, to form a quad-layer laminate or a multi-layer laminate. The term "laminate blank" 140 describes two or more materials laminated together and cut into a desired blank shape 142. Thus, it will be appreciated that the laminate blank 140 may comprise more or less layers than illustrated in FIG. 11.

Generally, as shown in FIG. 11, the laminate blank 140 has a 2-dimensional shape, i.e. the laminate blank 140 is generally flat when resting unconstrained on a flat surface. Preferably, the laminate blank 140 shape and size are configured so that minimal or no trimming is required after molding the seat trim cover 36 and prior to assembly with other components (not shown). An upper surface 148 of the upper textile layer 50 and a lower surface 150 of the scrim backing layer 64, as orientated and assembled into the laminate blank 140, are generally referred to as "A-surface" and "B-surface", respectively, of the molded seat trim cover 36.

Figure 12A:
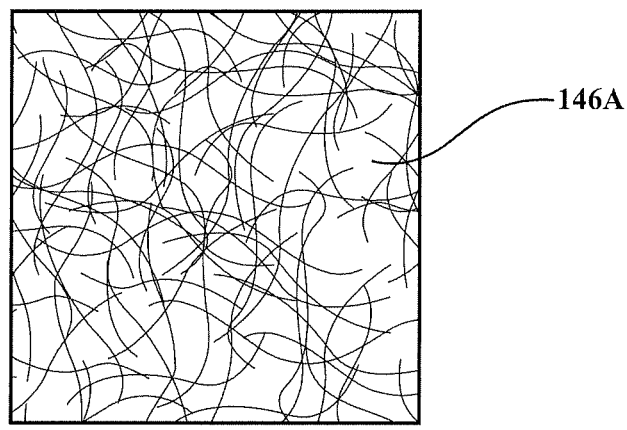
FIGS. 12A-12C illustrate adhesive application patterns, according to embodiments of the present invention.
Figure 12B:
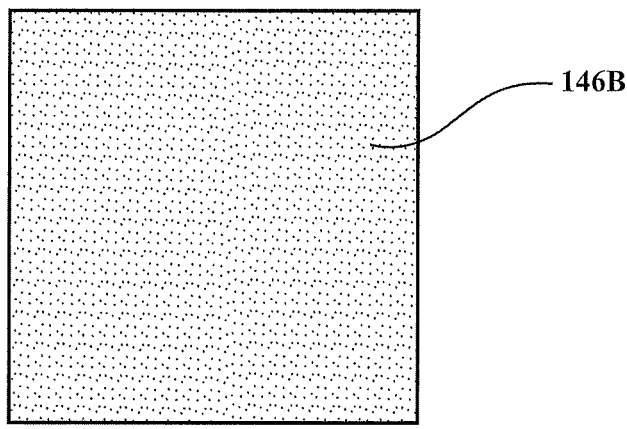
Figure 12C:
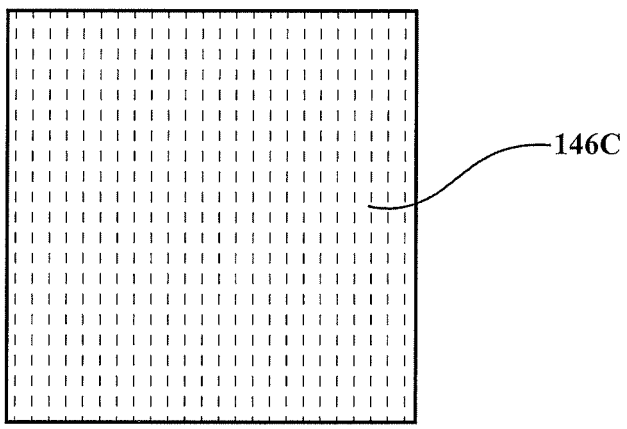

One or more adhesive layers 68, 70, 72 adhere the upper textile layer 50, the TPU film 56, and, optionally, the scrim backing layer 64 to the moldable foam interlayer 54 as illustrated in FIG. 6. The selection of an adhesive and/or adhesive method is based in part on the choice of materials for the upper textile layer 50 and the scrim backing layer 64. A variety of known adhesives, such as thermoplastic adhesives, and one-part or two-part urethane adhesives (referred to as "1K" and "2K" adhesives), are suitable for adhesively bonding certain upper textile layers 50 and scrim backing layers 64 to the foam interlayer 54 and/or to the TPU film 56. FIGS. 12A-12C illustrate exemplary adhesive application patterns. The adhesive 68, 70, 72 can be applied by spraying, or can alternatively be a film or spider web-like pattern 146A (shown in FIG. 12A). One preferred method is applying adhesive to the upper textile layer 50 and/or the foam interlayer 54 in a spider web-like pattern 146A that is non-continuous. Other exemplary non-continuous adhesive application patterns include an array of dots 146B (shown in FIG. 12B) and an array of short segments 146C (shown in FIG. 12C). It will be appreciated that other adhesive application patterns may be selected, including irregular patterns, as suitable for an intended application, without varying the scope of the invention. Generally, various non-continuous patterns of adhesive 68, 70, 72 applications are suitable where airflow between adjacent layers is desired. Further, thermoplastic adhesive can be roll-coated onto one or more surfaces to be bonded. Alternatively, gaps in adhesive coverage can be incorporated when applying adhesive to assure the bond between adjacent layers 50, 54, 56, 64 is air permeable. Also, specific gaps can be included to provide openings for airflow, either when applying adhesive in a spider web-like pattern 146A or when applying adhesive by other methods.

Thermoplastic adhesive can be remelted at elevated temperatures to separate the upper textile layer 50 from the foam interlayer 54, and then reassemble the upper textile layer 50 to the foam interlayer 54 to correct defects at any time during the manufacturing of the seat trim cover 36. Both 1K and 2K type adhesives have a delayed curing response and act like thermoplastic adhesive in the first 4 hours, permitting rebonding if needed. The 1K and 2K adhesives cure to a permanent bond within 24 hours. Both 1K and 2K adhesive systems eventually become thermosetting materials, so the bond between the layers 50, 54, 56, 64 becomes irreversible.

As an alternative to adhesive, the upper textile layer 50, the foam interlayer 54, the TPU film layer 56, and/or scrim backing layer 64 can be bonded to an adjacent layer by flame lamination. Flame lamination is a commonly known process to bond one or more layers of material to a foam interlayer 54 after passing the foam interlayer 54 past a flame to melt the surface of the foam interlayer 54. Flame lamination produces a permanent bond between the adjacent layers 50, 54, 56, 64. One or more of the adhesive layers 68, 70, 72 may be optionally replaced by flame lamination. The upper textile layer 50, the moldable foam interlayer 54, the TPU film layer 56, the optional scrim backing layer 64, and/or other material layers, as desired, may be adhered to one another with flame lamination such that one or more adhesive layers 68, 70, 72 are omitted between the adjacent layers 50, 54, 56, 64.

Additionally, two or more layers 50, 54, 56, 64 may be adhered by flame lamination prior to or after adhering one or more additional layers 50, 54, 56, 64 with adhesive if desired. It will be appreciated that the selection of adhesive type (such as 1K or 2K urethane adhesives) and/or flame lamination is based in part on the selected upper textile layer 50 and the desired processing methods. As is generally well known to those skilled in the art, certain materials are suitable for being adhered using flame lamination. Other materials may be more suitably bonded with a 1K or 2K urethane adhesive or other known adhesives. For example, certain leathers may be unsuitable for being adhered to the moldable foam interlayer 54 using flame lamination.

Further, additional adhesive layers may be used when the laminate blank 140 includes more than three layers. Also, individual layers may be adhered to an adjoining layer prior to or after cutting the layers into the blank shape 142. For example, the TPU film layer 56 and the foam interlayer 54 may be bonded together using flame lamination or adhesive and then cut into a foam/TPU film blank (not shown). The foam/TPU film blank may be adhered to a pre-cut textile blank 50' using an adhesive or flame lamination. Alternatively, multiple layers 50, 54, 56, 64 may be stacked to form a stacked assembly 140 with one or more individual layers 50, 54, 56, 64 being unbonded until the stacked assembly 140 is compression molded. It will be appreciated that any combination of adhesive, flame lamination, bonding during the compression molding process, pre-cutting, and post-cutting, as well as material selection and number of layers, may be selected based on the desired finished ventilated seat trim cover 36 for a given application and/or preferred manufacturing method.

Another embodiment of the TPU film 56 is a dual layer TPU film 154 (shown in FIG. 15A) having a low melt temperature TPU film layer 162 and a high melt temperature TPU film layer 164, also referred as "low-temp TPU" film layer 162 and "high-temp TPU" film layer 164, respectively. A preferred embodiment the low-temp TPU film layer 162 has a melting point in the temperature range of about 60° C. to about 120° C. (about 140° F. to about 248° F.). A preferred embodiment of the high-temp TPU film layer 164 has a melting point in the temperature range of about 120° C. to about 150° C. (about 248° F. to about 302° F.). The melting point of the low-temp and high-temp TPU film layers 162, 164 are selected such that the foam interlayer 54 can be flame laminated to the high-temp TPU film layer 164 without melting either of the low-temp TPU film layer 162 or the high-temp TPU film layer 164. Further, when a laminated sub-assembly 172 (shown in FIG. 15A) of the foam interlayer 54 flame laminated to the high-temp TPU film layer 164 is assembled with the scrim backing layer 64 (adjacent the low-temp TPU film layer 162), the low-temp TPU film layer 162 melts during the compression molding process to permanently bond the high-temp TPU film layer 164 to the scrim backing layer 64.

Figure 16:
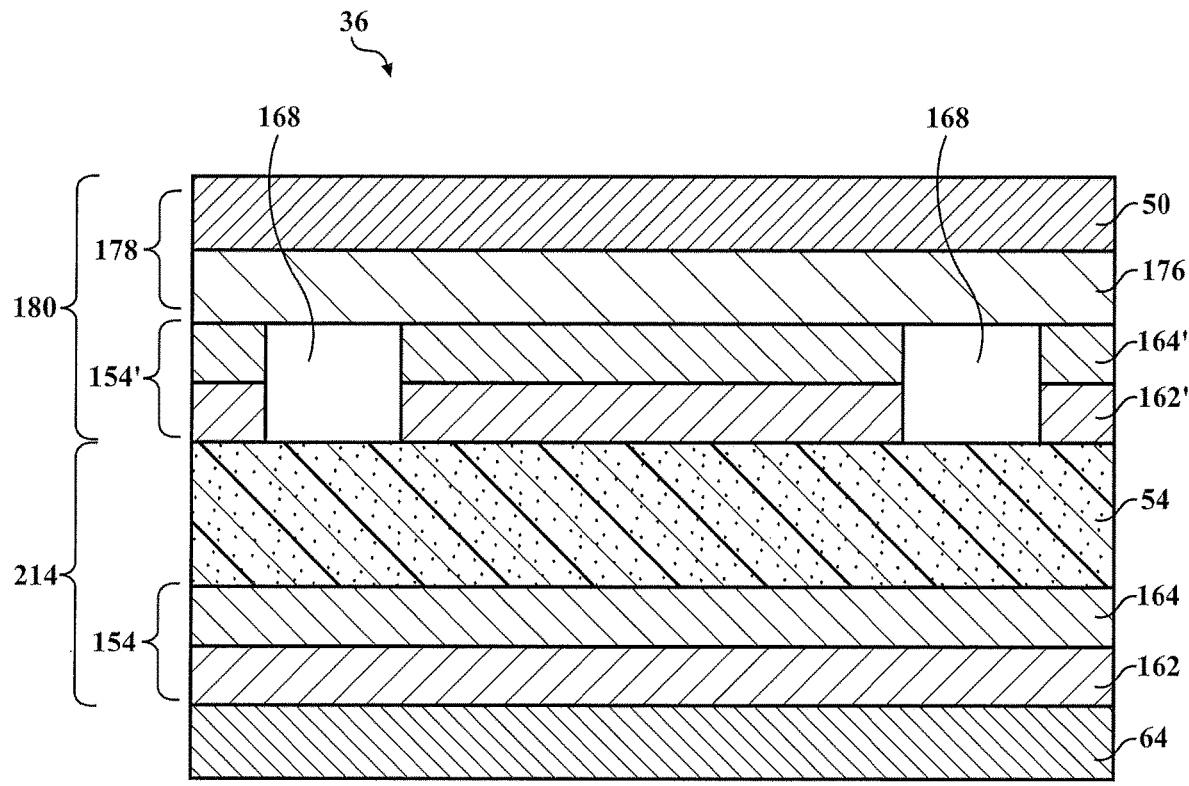
FIG. 16 illustrates a stacked assembly of an upper textile layer, a plus pad, a first dual layer TPU film, a foam interlayer, a second dual layer TPU film, and a scrim backing layer, according to a third embodiment of the present invention.

A second embodiment of a dual layer TPU film 154', shown in FIG. 16, includes one or more openings 168 to allow for airflow through the dual layer TPU film 154'. As with the first embodiment of the dual layer TPU film 154, the second embodiment of the dual layer TPU film 154' includes a low-temp TPU film layer 162' and a high-temp TPU film layer 164'.

Certain upper textile layers 50 are prelaminated to a foam pad 176, referred to as a "plus foam pad" 176, forming a textile/plus pad sub-assembly 178, as shown in FIG. 16. The plus foam pad 176, of the textile/plus pad sub-assembly 178, can be flame laminated to a high-temp TPU film layer 164' of a dual layer TPU film 154', forming a textile/plus pad/dual layer TPU film sub-assembly 180. In this case, the dual layer TPU film 154' includes openings 168 for airflow into the plus foam pad 176 and the upper textile layer 50. When textile/plus pad/dual layer TPU film sub-assembly 180 is stacked adjacent the foam interlayer 54 in the lower compression mold tool 134B, a low-temp TPU film layer 162' of the dual layer TPU film 154' melts during the compression molding process to permanently bond the high-temp TPU film layer 164' to the foam interlayer 54.

Suitable upper textile layers 50 include a variety of textiles, perforated vinyls, and perforated leathers. Exemplary textiles include polyester, polyester blends, acrylic blends, rayon, nylon, and similar fabrics. The selection of a textile 50 for a desired application depends on the amount of elongation in the lengthwise and the crosswise direction of the textile 50 in conjunction with the amount of forming required during the molding process. Generally, upper textile layers 50 having about 10% to about 25% elongation in both the lengthwise and crosswise directions have been found to be desirable. However, upper textile layers 50 with more or less elongation may be suitable depending on the desired 3-dimensional molded shape and the amount of concavity in the mold tools 134. The selected textile 50 can have a flat surface, a knap construction, and/or be woven or non-woven, depending on the desired appearance of the molded seat trim cover 36. Optionally, textiles 50 can be laminated with foam materials, such as the plus foam pad 176, and/or spacer materials (not shown) to generate a desired appearance of the molded seat trim cover 36.

A wide selection of upper textile layers 50 are suitable for use with the disclosed molding process since the preferred mold tool 134 temperature range, about 65° C. to about 160° C. (about 150° F. to about 320° F.), is below the distortion temperatures for a variety of fabrics. Certain fabrics are unsuitable for use in known prior art molding processes having molding temperatures in a range of about 148° C. to about 249° C. (about 300° F. to about 480° F.) since these fabrics may get distorted or damaged by the higher level of heat. Lowering the mold tool 134 temperature to a range of about 65° C. to about 160° C. (about 150° F. to about 320° F.) reduces and/or prevents fabric distortion during the molding process. Further, the lower molding temperatures used in the disclosed process allows for an increase in obtainable contour of the 3-dimensional shape of the molded seat trim cover 36 without distorting or damaging the upper textile layer 50. Additional materials and/or laminate layers can be molded into a 3-dimensional shape by optionally adding vacuum assist and a removable barrier film (not shown) to the molding process, as will be described below.

The moldable foam interlayer 54 underneath the upper textile layer 50 is used to achieve the desired final molded shape and to provide a soft and comfortable feel in the molded seat trim cover 36. The firmness, density, and thickness of the moldable foam interlayer 54 are selected to achieve a desired look or feel of the vehicle seat assembly 16. The moldable foam interlayer 54 is an air permeable open cell polyurethane (PU) foam formulated to be moldable at temperatures between about 104° C. to about 127° C. (about 220° F. to about 260° F.) as desired for an intended application.

As is generally known in the art of manufacturing polyurethane foams, the glass transition temperature (Tg) of polyurethane foam is related to the upper limit of service temperature of the PU foam as well as the temperature at which the PU foam can be molded. Further, it is well known in the art that the Tg of a PU foam is affected by the foam chemistry, and in particular, the amount of cross-linking in the PU foam. Adding a graft polyol as well as adjusting diol content is one method of adjusting the Tg of PU foam. The Tg of PU foam can be controlled such that a selected moldable PU foam can be molded at temperatures between about 104° C. to about 127° C. (about 220° F. to about 260° F.) and still maintain support for the occupant and pass all applicable testing requirements, including life cycle, durability, and heat-aging.

Typical PU foam formulations used in vehicle seating applications are generally moldable at temperatures greater than about 160° C. (about 320° F.). These foam formulations have previously been selected in order to ensure that vehicle seat assemblies 16 have acceptable performance over the life of a vehicle (not shown) and to permit short manufacturing cycle times. However, the PU foams with higher Tg values are difficult to mold and require expensive and/or complex molding methods. Further, the high mold temperatures restrict options for the upper textile layers 50 because some textile materials are unsuitable for molding at temperatures above about 160° C. (about 320° F.). In addition, some of these known molding processes result in trim covers 18A having reduced breathability.

It has been found that by reducing the Tg in moldable PU foam, satisfactory results can be obtained by molding seat trim covers 36 with a foam molding temperature of about 104° C. to about 127° C. (about 220° F. to about 260° F.), as disclosed in the present invention. Further, since the foam molding temperature is about 127° C. (about 260° F.) or less, the cost and complexity of the mold tools 134 is reduced and the range of suitable upper textile layers 50 is increased.

The optional scrim backing blank 64' is illustrated in FIG. 10. As shown, the scrim backing layer 64 has been optionally pre-cut into the scrim blank 64' prior to assembly into the laminate blank 140. The scrim backing layer 64 improves the handling of the molded seat trim cover 36 when sewn to other components in an assembled trim cover 18. However, it will be appreciated that the scrim backing layer 64 may be omitted if desired.

While the scrim backing layer 64 may be a woven or non-woven fabric, the elongation in the fibers of the scrim backing layer 64 impacts the formability of the laminate blank 140 during the molding process. Fabrics with greater elongation in the fibers are preferred over fabrics with less elongation in the fibers when molding highly-contoured molded seat trim covers 36. Further, selecting an upper textile layer 50 and scrim backing layer 64 having similar elongation in the fibers is preferred. Some common non-woven scrim backing layers 64 have suitable properties for both elongation and loop attachment behavior. Non-woven scrim backing layers 64 are inexpensive and pass typical warranty criteria, assembly criteria, and disassembly criteria.

It will be appreciated that the individual layers, shown in FIG. 6 and FIGS. 14A-18, can be assembled in any order suitable for an intended application and desired manufacturing process. Further, it will be appreciated that any suitable adhesive may be selected based on the desired manufacturing process and composition of the A-surface upper textile layer 50. In addition, it will be appreciated that adhesive layers 68, 70, 72 can be replaced with flame lamination as is generally known in the art. The selection of adhesive layer 68, 70, 72 or flame lamination, as well as the desired coverage of adhesive layers 68, 70, 72, is based on the intended application and preferred manufacturing methods. It will be appreciated that any combination and order of cutting, assembling, and adhering desired for an intended application can be selected.

Further, it will be appreciated that more or less layers can be incorporated into the laminate blank 140 than shown in the Figures. It will be appreciated that one or more sensors, electrical circuits, and/or alternate materials such as fiber batting and/or additional layers of foam can be incorporated into laminate blank 140 if desired. Also, while not specifically shown in the Figures, the A-surface upper textile layer 50 can comprise one or more pieces of material fastened together along a seam and/or layered together if desired.

A mold tool 134 for molding seat trim covers 36 from preformed laminate blanks 140, according to one embodiment of the present invention, is illustrated in FIGS. 13A and 13B. FIG. 13A illustrates a laminate blank 140 placed between upper and lower mold tools 134A, 134B. It will be appreciated that while the following description includes a laminate blank 140, individual layers may be inserted into the mold tool 134 without altering the scope of the invention. The upper and lower mold tools 134A, 134B have molding surfaces 190, 192 with a 3-dimensional shape, optionally one or more protrusions 194, and optionally one or more recessed areas 196. The upper and lower mold tools 134A, 134B can have different surface temperatures to be more compatible with various constructions of the upper textile layer 50 and foam interlayer 54.

While not shown in the Figures, additional components may be inserted into the upper and/or lower mold tool 134A, 134B for mounting the molded seat trim cover 36 to the base foam pad 30A, providing connections to other components such as airflow channels 82, and/or including support brackets 76 in the molded seat trim cover 36. The support bracket 76 may include an air passageway 78 to pass airflow through the TPU film layer 56 and into the foam interlayer 54, as shown in FIG. 7. Further, the support bracket 76 may be configured to fluidically connect to an airflow channel 82 in the base foam pad 30A and/or connect to an alternate air supply port (not shown) in the vehicle seat 16.

FIG. 13B illustrates the laminate blank 140 compression molded to form the seat trim cover 36. The 3-dimensional shape is formed in a seat trim cover 36 by placing the laminate blank 140 between the upper 3-dimensionally shaped mold tool 134A and the lower 3-dimensionally shaped mold tool 134B, as generally illustrated in FIG. 13A, compressing the laminate blank 140 between the upper and lower mold tools 134A, 134B with about 150 psi to about 250 psi pressure, and applying heat in a temperature range of about 65° C. to about 160° C. (about 150° F. to about 320° F.) to shape and compress the moldable foam interlayer 54, and removing the upper mold tool 134A from the molded seat trim cover 36 after a processing time of about 90 seconds to about 10 minutes. The amount of localized compression, as well as the formed induced surface contour, results in a formed 3-dimensional seat trim cover 36 after molding which generally retains the desired 3-dimensional shape.

It will be appreciated that the compression molding process may incorporate a vacuum assist step as desired for certain selected materials, thickness of the laminate blank 140, as well as the degree of contour in the upper and lower molding surfaces 134A, 134B. While not shown in the Figures, integrating vacuum assist as well as overall heating and/or spot heating into the upper and lower mold tools 134A, 134B is generally known to one skilled in the art of fabricating molding tools. The vacuum-form assist step can be performed before and/or during the compression molding step if desired. Improved appearance, increased 3-dimensional depth, and improved molded details can be obtained with certain materials, such a leather and/or thicker upper textile materials 50 or laminate blanks 140 with more than three layers, by adding vacuum assist during the molding process to partially or completely pre-form the laminate blank 140 against the upper or lower molding surface 134A, 134B.

To incorporate vacuum assist within the molding process, a barrier film (not shown) is placed on top of the laminate blank 140 after the laminate blank 140 is placed on the lower molding tool 134B. Vacuum is applied through the lower mold tool 134B to partially or fully form the laminate blank 140 to the lower mold tool 134B. The upper mold tool 134A is compressed against the barrier film and the laminate blank 140 and the upper and/or lower mold tools 134A, 134B are heated to a temperature of about 65° C. to about 160° C. (about 150° F. to about 320° F.) to shape and compress the moldable foam interlayer 54. The mold tools 134A, 134B may be uniformly heated. Alternatively, the mold tools 134A, 134B may have localized areas with increased heat temperature, as desired. The upper mold tool 134A is removed from the barrier film and molded seat trim cover 36. The seat trim cover 36 is removed from the lower molding tool 134B. Breathability of the molded seat trim cover 36 is generally retained since the barrier film is only used during the vacuum forming and compression molding processes, and removed from the molded seat trim cover 36 prior to assembling the molded seat trim cover 36 into a finished assembly 18. It will be appreciated that the disclosed process may include more or less processing steps, as well as a different sequence of steps, as desired for a specific application or manufacturing process.

The selection of the molding temperature range and the location of zone heating in the mold tool 134 are based, in part, on the selected upper textile layer 50, the number of layers in the laminate blank 140, the selected mold design 134A, 134B, and the amount of concavity 44 and molding details 42 being formed in the molded trim cover 36. Generally, utilizing a mold temperature range of about 65° C. to about 160° C. (about 150° F. to about 320° F.) is desired. This will allow the foam interlayer 54 to be molded at a temperature range of about 104° C. to about 127° C. (about 220° F. to about 260° F.), producing acceptable molded seat trim covers 36 with machine cycle times from about 90 seconds to about 10 minutes depending on the forming aggressiveness and thickness of the laminate blank 140.

Compression molding pressures of about 150 psi to about 250 psi are generally sufficient to produce satisfactory results. It will be appreciated that more or less molding pressure may be desired depending on a specific application, laminate blank 140 construction, machine configuration, and other factors such as machine cycle time. A pneumatic cylinder press is generally adequate to provide the desired amount of compression force during the molding process. Aluminum molding tools are generally suitable for the disclosed molding process since the desired molding temperature range is generally equal or less than about 165° C. (about 320° F.) and the molding pressures are generally equal or less than about 250 psi. The disclosed molding process does not require steel molding tools and/or hydraulic presses, and thus, the disclosed molding process can use lower cost mold tools 134 and lower cost machines than previously known molding methods for seat trim covers 36. Further, the mold tools 134A, 134B can have self-contained heating systems (not shown) and can be adapted to have zonal heating as needed to facilitate more or less aggressive contours and styling lines. Vacuum assist can be integrated in the mold tools 134A, 134B when desired for a particular application and/or laminate blank 140 construction.

Compared to known trim covers (not shown) molded in 2-dimensional shapes, minimal bending of the seat trim cover 36 is required when assembling the seat trim cover 36 into a trim cover assembly 18 and when applying the trim cover assembly 18 to a vehicle seat 16. A reduction in the necessary bending or folding of the 3-dimensional molded seat trim cover 36 reduces the wrinkling induced compared to a 2-dimensional molded trim cover. While less bending of the seat trim cover 36 is required when the seat trim cover 36 is assembled to a vehicle seat 16, the seat trim cover 36 can be bent and twisted during assembly with additional seat cover components without permanently distorting the molded seat trim cover 36. When the seat trim cover 36 is unrestrained, the seat trim cover 36 tends to generally return to the as-molded shape.

Edges 36E of the seat molded trim cover 36, shown in FIG. 4, are optionally trimmed and/or skived prior to assembling and/or sewing with other seat cover components 38 to form the finished trim cover assembly 18.

After the seat trim cover 36 is assembled into a final seat trim cover assembly 18 (by adding side components 38 and optional fasteners if needed), the seat trim cover assembly 18 is assembled on the base foam pad 30A to form the seat cushion 24 and/or seat back 22 of the vehicle seat 16, as illustrated in FIG. 3. The seat trim cover 36 is preferably releasably attached to the base foam pad 30A. When the base foam pad 30A includes an air channel 82, the seat trim cover 36 is aligned with the base foam pad 30A such that airflow through the air channel 82 can pass through the TPU film layer 56 of the seat trim cover 36 and into the foam interlayer 54. If the seat trim cover 36 includes a support bracket 76 having a passageway 78 configured to pass airflow through a passageway 84 in the TPU film layer 56 and into the foam interlayer 54, the support bracket 76 is coupled with the air channel 82 in the base foam pad 30A.

The base foam pad 30A provides the main support surface of a seating system as well as provides stability to maintain the contours of the overall vehicle seat 16 design. The base foam pad 30A does not require any design features when desired design features and styling lines are formed in molded "A-Surface" seat trim cover 36. Thus, a standardized base foam pad 30A can be used with many vehicle seat 16 designs when combined with a variety of seat trim cover 36 designs. Using a standardized base foam pad 30A reduces complexity in the foam manufacturing plants and seat assembly processes. There is a reduction in scrap and rework during the manufacturing process by including the design features in a removable seat trim cover 36 in combination with a simplified base foam pad 30A.

Figure 14A:
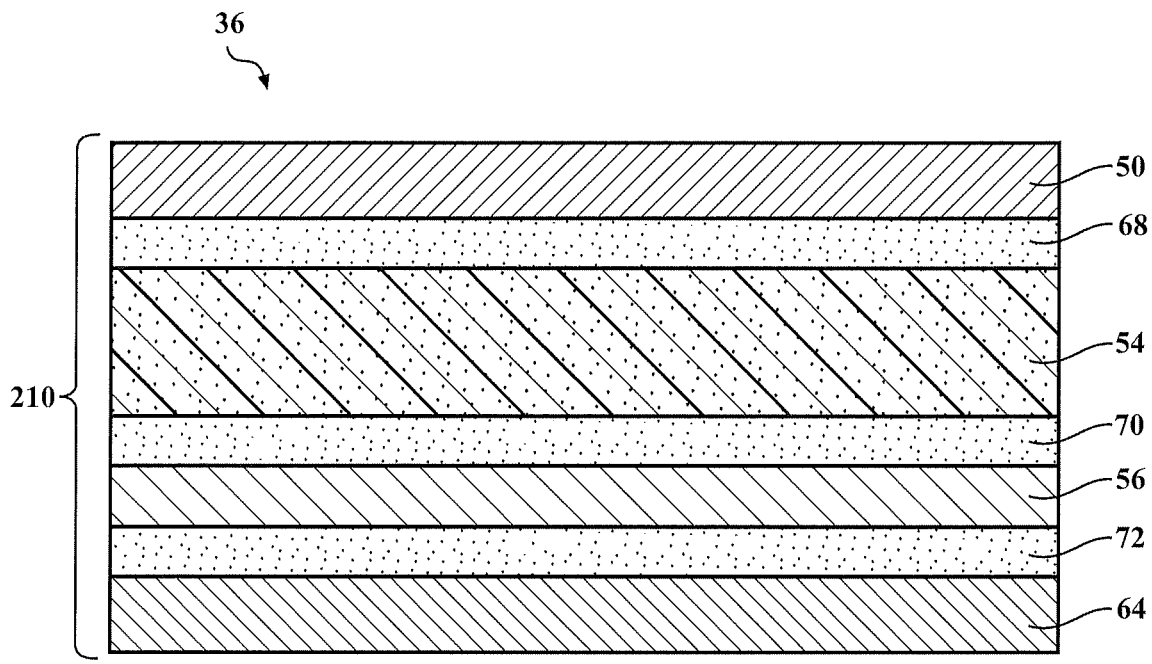
FIGS. 14A and 14B illustrate a stacked assembly of an upper textile layer, a first adhesive layer, a foam interlayer, a second adhesive layer, a thermoplastic polyurethane (TPU) film, a third adhesive layer, and a scrim backing layer, according to one embodiment of the present invention.
Figure 14B:
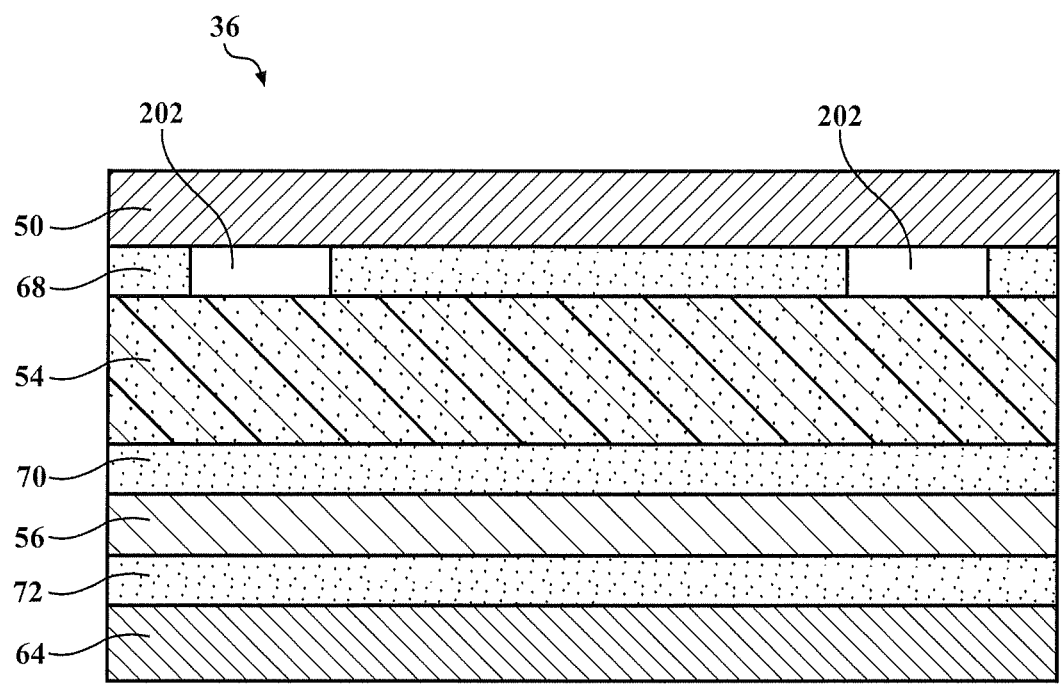

Various embodiments of the seat trim cover 36 are described below in FIGS. 14A-18. Referring to FIGS. 14A and 14B, a first embodiment of the seat trim cover 36 includes an upper textile layer 50, a first adhesive layer 68, a moldable air permeable foam interlayer 54, a second adhesive layer 70, a TPU film layer 56, a third adhesive layer 72, and a scrim backing layer 64. The upper textile layer 50 is a layer of fabric, perforated vinyl, and/or perforated leather. The upper textile layer 50 is bonded to the thermo-moldable foam interlayer 54 through adhesive bonding. The adhesive 68 is applied in a spider web-like pattern 146A that is non-continuous. The spider web-like pattern 146A allows air to flow freely between the foam interlayer 54 and the upper textile layer 50 and to pass through the fabric and/or perforations in the vinyl/leather. Alternatively, as shown in FIG. 14B, larger openings 202 can be created in the upper adhesive layer 68 to further direct airflow at preferred locations.

Shown in FIG. 14A, the TPU film layer 56 is bonded to the foam interlayer 54 through adhesive bonding with the adhesive 70 applied in a spider web-like pattern 146A that is non-continuous. Applying the adhesive 70 in a spider web-like pattern 146A allows air to flow freely through the foam interlayer 54. The TPU film layer 56 is also bonded to a non-woven textile scrim backing layer 64 through adhesive bonding 72. The adhesive bond 72 can be applied either in a spider we-like pattern or as a solid film, as desired for a specific application. The TPU film layer 56 prevents airflow through the bottom of the seat trim cover 36.

Each of the layers 50, 54, 56, 64 shown in FIG. 14A is optionally introduced separately into the compression molding process to form a stacked assembly 210. For example, the scrim backing layer 64 can be placed on the lower mold tool 134B, a first adhesive layer 72 applied to the scrim backing layer 64, the TPU film layer 56 placed on top of the first adhesive layer 72, a second adhesive layer 70 applied to the TPU film layer 56, the thermo-moldable foam interlayer 54 placed on top of the second adhesive layer 70, a third adhesive layer 68 applied to the foam interlayer 54, the upper textile layer 50 placed on top of the third adhesive layer 68, followed by compression molding the resulting stacked assembly 210 as previously described.

Figure 15A:
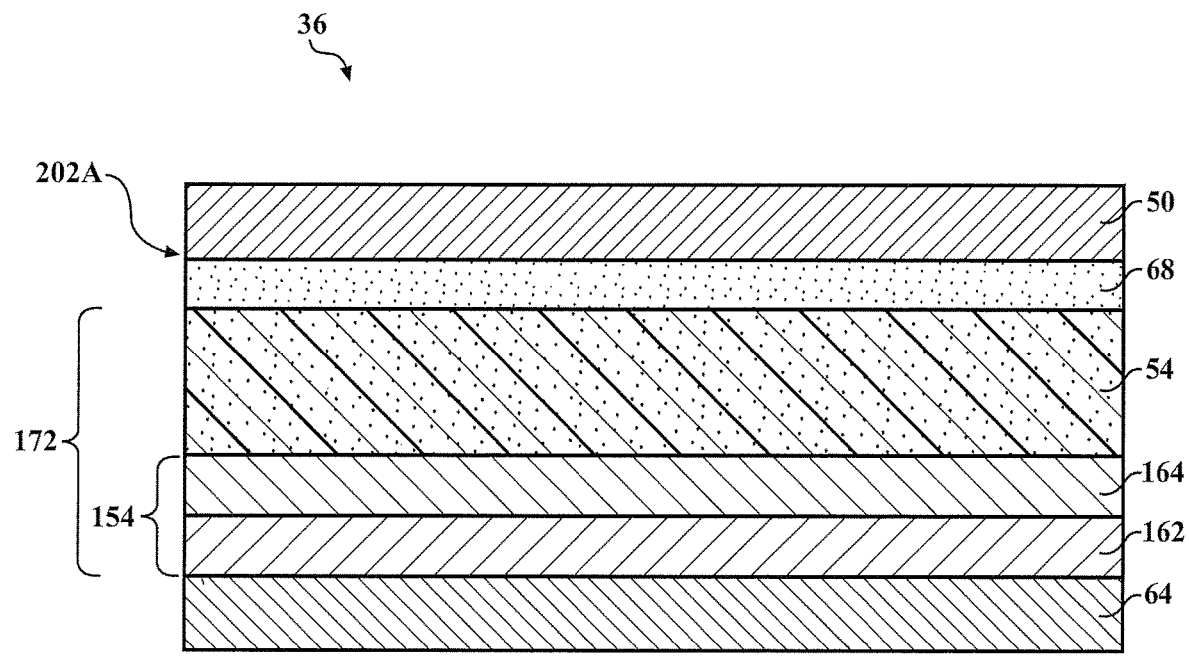
FIGS. 15A and 15B illustrate a stacked assembly of an upper textile layer, a first adhesive layer, a foam interlayer, a dual layer thermoplastic polyurethane (TPU) film, and a scrim backing layer, according to a second embodiment of the present invention.
Figure 15B:
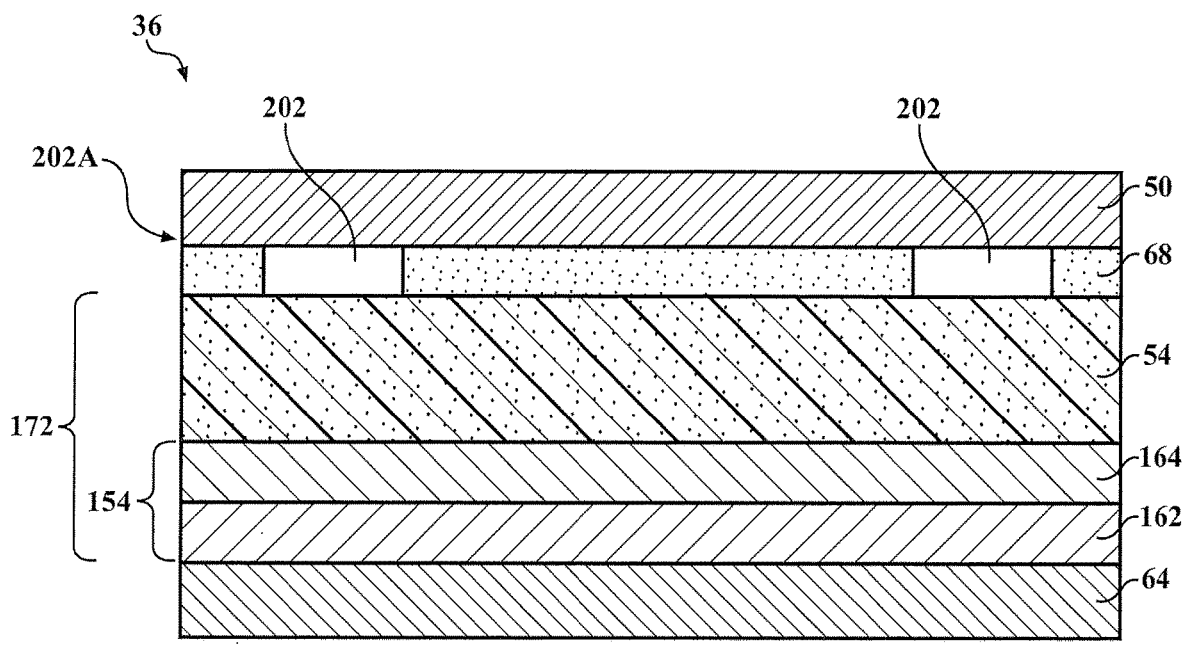

FIGS. 15A and 15B illustrate a second embodiment of the seat trim cover 36 comprising an upper textile layer 50, a thermo-moldable foam interlayer 54, and a scrim backing layer 64 as in the first embodiment shown in FIGS. 14A and 14B. The TPU film layer 56 is replaced by a dual layer TPU film 154 having a low-temp TPU film layer 162 and a high-temp TPU film layer 164. A preferred embodiment of the low-temp and high-temp TPU film layers 162, 164 have melting points in the range of about 60° C. to about 120° C. (about 140° F. to about 248° F.) and about 120° C. to about 150° C. (about 240° F. to about 302° F.), respectively. The foam interlayer 54 is flame laminated to the high-temp TPU film layer 164 to form a foam/TPU film sub-assembly 172. Neither of the low-temp or the high-temp TPU film layers 162, 164 melt during the flame lamination process.

In the embodiment shown in FIGS. 15A and 15B, the scrim backing layer 64 is placed on the lower compression mold tool 134B with the foam/TPU film sub-assembly 172 placed on top of the scrim backing layer 64. Adhesive 68 is applied in a spider web-like pattern 146A that is non-continuous to the foam interlayer 54 and/or to the upper textile layer 50. Applying adhesive in a spider web-like pattern 146A enables air to flow freely between the foam interlayer 54 and the upper textile layer 50. Larger openings 202 can be formed in the adhesive layer 68 to further direct airflow at preferred locations, as illustrated in FIG. 15B. The upper textile layer 50 is assembled with the adhesive 68, the foam/TPU film sub-assembly 172, and the scrim backing layer 64 forming a layered stack 202A. The layered stack 202A is compression molded between the upper and lower mold tools 134A, 134B with about 150 psi to about 250 psi pressure while applying heat in a temperature range of about 65° C. to about 160° C. (about 150° F. to about 320° F.) to shape and compress the moldable foam interlayer 54. During the compression molding process, the low-temp TPU film layer 162 melts and bonds the high-temp TPU film layer 164 to the scrim backing layer 64. The high-temp TPU film layer 164 prevents airflow through the bottom of the molded seat trim cover 36.

FIG. 16 illustrates a third embodiment of the seat trim cover 36 comprising an upper textile layer 50, a thermo-moldable foam interlayer 54, and a scrim backing layer 64 similar to the embodiment shown in FIG. 14A. However, the upper textile layer 50 is flame laminated and/or adhered to a plus foam pad 176 to form a textile/plus pad sub-assembly 178. In addition, the upper adhesive layer 68 shown in FIG. 14A is replaced by a first dual layer TPU film 154' having a low-temp TPU film layer 162' and a high-temp TPU film layer 164' with melting points in the range of about 60° C. to about 120° C. (about 140° F. to about 248° F.) and about 120° C. to about 150° C. (about 240° F. to about 302° F.), respectively. The first dual layer TPU film 154' includes openings 168 for airflow. The plus foam pad 176 attached to the upper textile layer 50 is flame laminated to the high-temp TPU film layer 164' forming an upper textile/TPU sub-assembly 180. As in the second embodiment, a dual layer TPU film 154 having a low-temp TPU film layer 162 and a high-temp TPU film layer 164, with melting points in the range of about 60° C. to about 120° C. (about 140° F. to about 248° F.) and about 120° C. to about 150° C. (about 240° F. to about 302° F.), respectively, is assembled with the foam interlayer 54 by flame laminating the foam interlayer 54 to the high-temp TPU film layer 164, forming a foam interlayer/TPU film sub-assembly 214.

In the embodiment shown in FIG. 16, the upper textile/TPU sub-assembly 180, the foam interlayer/TPU film sub-assembly 214, and the scrim backing layer 64 are stacked on the lower compression mold tool 134B. During the compression molding process, both of the low-temp TPU film layers 162', 162 melt, bonding the respective high-temp TPU film layer 164', 164 to an adjacent layer 54, 64. In specific, the upper high-temp TPU film layer 164' is bonded to the foam interlayer 54 and the lower high-temp TPU film layer 164 is bonded to the scrim backing layer 64. The lower high-temp TPU film layer 164 prevents air flow through the bottom of the seat trim cover 36. The openings 168 in the upper high-temp TPU film layer 164' allow directed airflow between the foam interlayer 54 and the upper textile layer 50.

Figure 17:
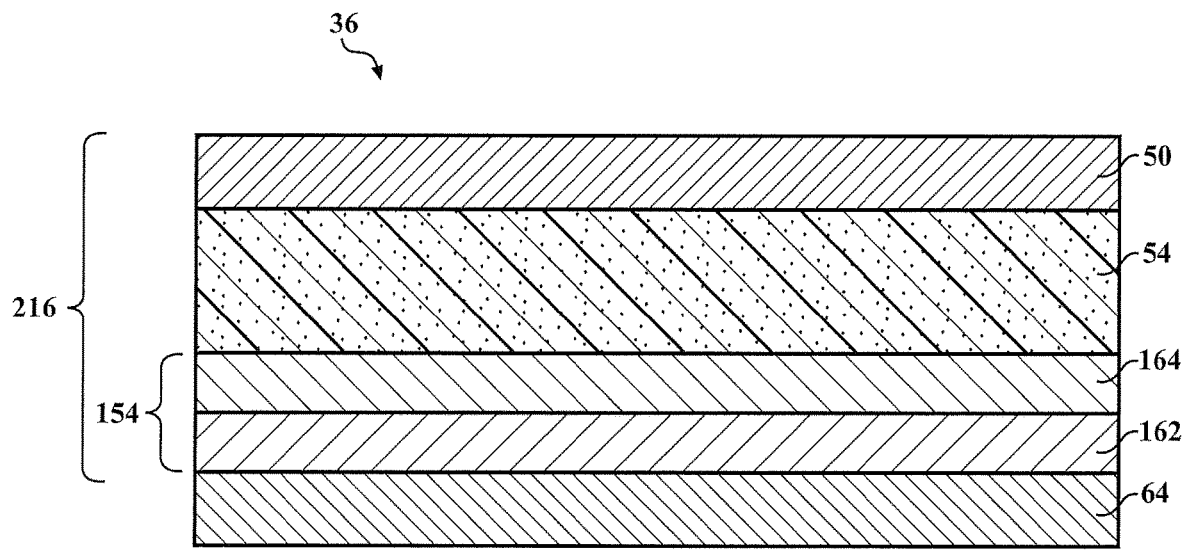
FIG. 17 illustrates a stacked assembly of an upper textile layer, a foam interlayer, a dual layer TPU film, and a scrim backing layer, according to a fourth embodiment of the present invention.

FIG. 17 illustrates a fourth embodiment of the seat trim cover 36 comprising an upper textile layer 50, a thermo-moldable foam interlayer 54, and a scrim backing layer 64 similar to the embodiment shown in FIG. 14A. The upper textile layer 50 is flame laminated to the foam interlayer 54. While not shown in FIG. 17, a plus foam pad 176 is optionally adhered or flame laminated to the upper textile layer 50 if desired for a specific application. In the case when the upper textile layer 50 includes the plus foam pad 176, the plus foam pad 176 is flame laminated to the foam interlayer 54. The seat trim cover 36 includes a dual layer TPU film 154 including a low-temp TPU film layer 162 and a high-temp TPU film layer 164 with melting points in the range of about 60° C. to about 120° C. and about 120° C. to about 150° C., respectively. The foam interlayer 54 is flame laminated to the high-temp TPU film layer 164 to form a textile/foam/TPU film tri-laminate sub-assembly 216. The textile/foam/TPU film tri-laminate sub-assembly 216 is stacked on the scrim backing layer 64 in the compression mold tool 134B. During the compression molding process, the low-temp TPU film layer 162 melts to bond the high-temp TPU film layer 164 to the scrim backing layer 64. The high-temp TPU film layer 164 prevents airflow through the bottom of the seat trim cover 36.

Figure 18:
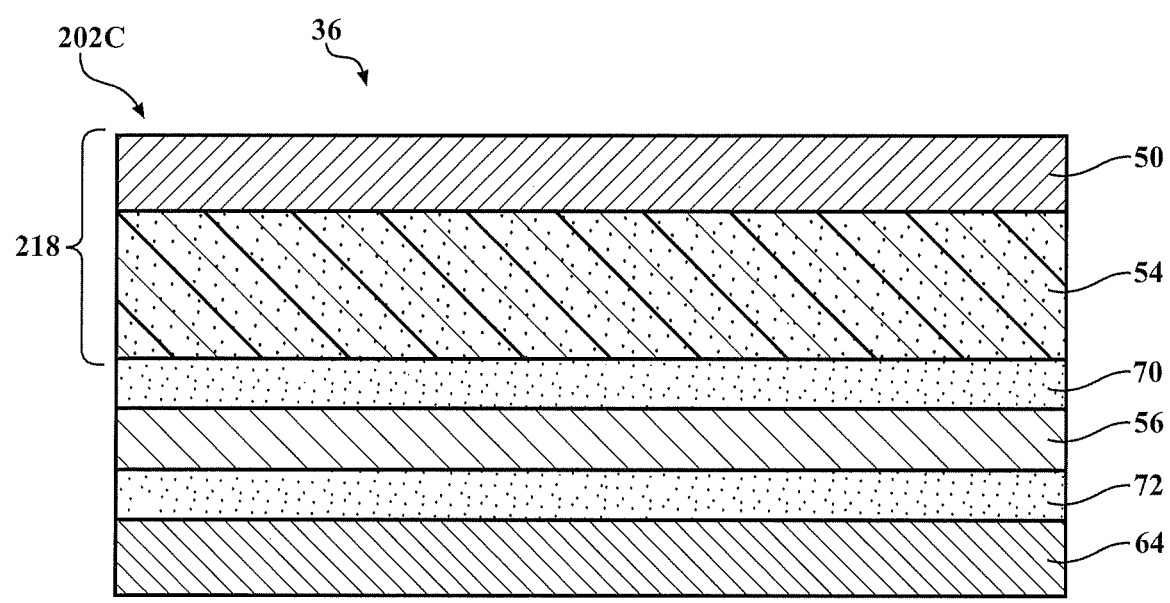
FIG. 18 illustrates a stacked assembly of an upper textile layer, a foam interlayer, a first adhesive layer, a TPU film, a second adhesive layer, and a scrim backing layer, according to a fifth embodiment of the present invention.

FIG. 18 illustrates a fifth embodiment of the seat trim cover 36 comprising an upper textile layer 50, a thermo-moldable foam interlayer 54, a TPU film layer 56, and a scrim backing layer 64 similar to the embodiment shown in FIG. 14A. The upper textile layer 50 is flame laminated to the foam interlayer 54 to form a textile/foam sub-assembly 218. While not shown in FIG. 18, a plus foam pad 176 is optionally adhered or flame laminated to the upper textile layer 50 if desired for a specific application. In the case when the upper textile layer 50 includes the plus foam pad 176, the plus foam pad 176 is flame laminated to the foam interlayer 54 to form the textile/foam sub-assembly 218. The TPU film layer 56 is bonded to the foam interlayer 54 through adhesive bonding with a first adhesive layer 70 applied in a spider web-like pattern 146A that is non-continuous. Applying the adhesive 70 in a spider web-like pattern 146A allows air to flow freely through the foam interlayer 54. The TPU film layer 56 is also bonded to the scrim backing layer 64 through adhesive bonding 72. The second adhesive layer 72 can be applied either in a spider web-like pattern 146A or as a solid film, as desired for a specific application. The TPU film layer 56 prevents airflow through the bottom of the seat trim cover 36.

The textile/foam sub-assembly 218 and each of the remaining layers 70, 56, 72, 64 shown in FIG. 18 are introduced separately into the compression molding process. For example, the scrim backing layer 64 can be placed on the lower mold tool 134B, a first adhesive layer 72 applied to the scrim backing layer 64, the TPU film layer 56 placed on top of the first adhesive layer 72, a second adhesive layer 70 applied to the TPU film layer 56, and the textile/foam sub-assembly 218 placed on top of the second adhesive layer 70, followed by compression molding the resulting stacked assembly 202C as previously described.

In the embodiments of the seat trim cover 36 shown in FIGS. 14A through 18, it will be appreciated that the order of assembly of the various layers can be reversed without altering the scope of the invention. For example, the upper textile layer 50 can be placed against the lower compression mold tool 134B with the scrim backing layer 64 positioned adjacent the upper compression mold tool 134A.

The disclosed FreeForm™ ventilated trim covers manufactured using the FreeForm™ process have many benefits over other known methods of manufacturing trim covers. One benefit is the FreeForm™ ventilated molded trim covers have an integrated airflow path eliminating the need for a plenum bag in a ventilated vehicle seat. A second benefit is having a molded ventilated trim cover that is breathable in desired locations to enhance airflow. A third benefit is the amount of styling details, contours, and complexity in the trim cover can be increased over what is practical with the traditional cut-and-sew covers.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A ventilated seat trim cover for a vehicle seat, comprising:
a stacked assembly of an upper textile layer of one or more of a fabric, perforated vinyl, and/or perforated leather, an air permeable thermo-moldable polyurethane cellular foam interlayer, a first thermoplastic polyurethane (TPU) film layer, and a scrim backing layer of a woven or non-woven textile;
wherein said stacked assembly is compression molded in a 3-dimensional mold while at least a portion of said foam interlayer is heated to a temperature of between about 104° C. to about 127° C. to form said ventilated seat trim cover;
wherein said first TPU film layer prevents airflow passing through a bottom surface of said ventilated seat trim cover; and
wherein airflow passing between said foam interlayer and an external environment adjacent said upper textile layer passes through said upper textile layer.

2. The ventilated seat trim cover as set forth in claim 1, wherein said foam interlayer is thermo-moldable at temperatures between about 104° C. and about 127° C.

3. The ventilated seat trim cover as set forth in claim 2, wherein said first TPU film layer is adhesively bonded to said foam interlayer by an adhesive applied to said first TPU film layer and/or to said foam interlayer in a non-continuous pattern.

4. The ventilated seat trim cover as set forth in claim 3, wherein said scrim backing layer is adhesively bonded to said first TPU film layer.

5. The ventilated seat trim cover as set forth in claim 4, wherein adhesive applied to one or more of said upper textile layer, said foam interlayer, said first TPU film layer, and/or said scrim backing layer is applied in a spider web pattern that is non-continuous.

6. The ventilated seat trim cover as set forth in claim 2, wherein said first TPU film layer includes a passageway such that airflow passing between said foam interlayer and an external environment adjacent said bottom surface of said trim cover passes through said passageway in said first TPU film layer.

7. The ventilated seat trim cover as set forth in claim 6, wherein said upper textile layer is adhered to said foam interlayer by flame lamination and/or by an adhesive applied to said upper textile layer and/or said foam interlayer in a non-continuous pattern.

8. The ventilated seat trim cover as set forth in claim 7, wherein said seat trim cover includes a plus foam pad flame laminated to one or more of said upper textile layer and/or said foam interlayer.

9. The ventilated seat trim cover as set forth in claim 6, said seat trim cover including a second TPU film layer, said second TPU film layer comprising a dual layer thermoplastic polyurethane (TPU) film;
said dual layer TPU film comprising a low melt temperature TPU film layer and a high melt temperature TPU film layer, said low melt temperature TPU film layer having a melting point in a temperature range of about 60° C. to about 120° C. and said high melt temperature TPU film layer having a melting point in a temperature range of about 120° C. to about 150° C.;
said upper textile layer including a plus foam pad adhered and/or flame laminated to said upper textile layer; and
said plus foam pad flame laminated to said high melt temperature TPU film layer of said second TPU film layer;
wherein at least a portion of said low melt temperature TPU film layer of said second TPU film layer melts during said compression molding to adhere said high melt temperature TPU film layer of said second TPU film layer to said foam interlayer; and
wherein said second TPU film layer includes one or more openings through said second TPU film layer allowing airflow between said foam interlayer and said upper textile layer.

10. The ventilated seat trim cover as set forth in claim 6, wherein said first TPU film layer is a dual layer TPU film comprising a low melt temperature TPU film layer and a high melt temperature TPU film layer, said low melt temperature TPU film layer having a melting point in a temperature range of about 60° C. to about 120° C. and said high melt temperature TPU film layer having a melting point in a temperature range of about 120° C. to about 150° C.

11. The ventilated seat trim cover as set forth in claim 10, wherein said high melt temperature TPU film layer of said first TPU film layer is flame laminated to said foam interlayer.

12. The ventilated seat trim cover as set forth in claim 11, said ventilated seat trim cover including said scrim backing layer adjacent to said low melt temperature TPU film layer of said first TPU film layer; and
wherein at least a portion of said low melt temperature TPU film layer of said first TPU film layer melts during said compression molding to adhere said scrim backing layer to said high melt temperature TPU film layer of said first TPU film layer.

13. The ventilated seat trim cover as set forth in claim 6, said ventilated seat trim cover including a support bracket assembled with said ventilated seat trim cover during said compression molding;

wherein said support bracket includes an airflow passageway configured to pass airflow from external of said trim cover, through said airflow passageway, and into said foam interlayer.

14. A ventilated vehicle seat, said ventilated vehicle seat comprising:

a foam base pad including an air channel passing through at least a portion of said foam base pad;
   a fan fluidically connected to said air channel and configured for directing airflow through said air channel;
   a ventilated seat trim cover formed by compression-molding an upper textile layer of one or more of a fabric, perforated vinyl, and/or perforated leather, an air permeable thermo-moldable polyurethane cellular foam interlayer formulated to be thermo-moldable between about 104° C. and about 127° C., a first thermoplastic polyurethane (TPU) film, and a scrim backing layer of a woven or non-woven textile in a 3-dimensional mold at about 150 psi to about 250 psi compressive force while at least a portion of said foam interlayer is heated to a temperature of about 104° C. to about 127° C. to compression mold said foam interlayer into a 3-dimensional shape;
   said first TPU film including a passageway through said first TPU film; and
   said ventilated seat trim cover being assembled with said foam base pad such that said passageway in said first TPU film is fluidically coupled with said air channel;
   wherein when said fan directs airflow through said air channel, airflow passes between said air channel and said foam interlayer through said passageway in said first TPU film, and airflow passes between said foam interlayer and through said upper textile layer.

15. The ventilated vehicle seat as set forth in claim 14, wherein said ventilated seat trim cover is releasably attached to said foam base pad.

16. The ventilated vehicle seat as set forth in claim 15, wherein said ventilated vehicle seat includes a thermoelectric device to actively cool air passing through said air channel.

17. The ventilated vehicle seat as set forth in claim 15, wherein said upper textile layer is adhesively bonded to said foam interlayer by an adhesive applied to said upper textile layer and/or to said foam interlayer in a non-continuous pattern.

18. The ventilated vehicle seat as set forth in claim 17, wherein:

said upper textile layer includes a plus foam pad adhered and/or flame laminated to said upper textile layer; and
   said plus foam pad is adhered and/or flame laminated to said foam interlayer.

19. The ventilated vehicle seat as set forth in claim 17, wherein said first TPU film is adhesively bonded to said foam interlayer by an adhesive applied to said first TPU film and/or to said foam interlayer in a non-continuous pattern.

20. The ventilated vehicle seat as set forth in claim 19, said scrim backing layer adhesively bonded to said first TPU film.

21. The ventilated vehicle seat as set forth in claim 15, said ventilated seat trim cover including a second thermoplastic polyurethane (TPU) film comprising a low melt temperature TPU film layer and a high melt temperature TPU film layer, said low melt temperature TPU film layer having a melting point in a temperature range of about 60° C. to about 120° C. and said high melt temperature TPU film layer having a melting point in a temperature range of about 120° C. to about 150° C.;

said upper textile layer including a plus foam pad adhered and/or flame laminated to said upper textile layer; and
   said plus foam pad flame laminated to said high melt temperature TPU film layer of said second TPU film;
   wherein at least a portion of said low melt temperature TPU film layer of said second TPU film melts during said compression molding to adhere said high melt temperature TPU film layer of said second TPU film to said foam interlayer; and
   wherein said second TPU film includes one or more openings through said second TPU film allowing airflow between said foam interlayer and said upper textile layer.

22. The ventilated vehicle seat as set forth in claim 15, wherein said first TPU film is a dual layer TPU film comprising a low melt temperature TPU film layer and a high melt temperature TPU film layer, said low melt temperature TPU film layer having a melting point in a temperature range of about 60° C. to about 120° C. and said high melt temperature TPU film layer having a melting point in a temperature range of about 120° C. to about 150° C.

23. The ventilated vehicle seat as set forth in claim 22, wherein said high melt temperature TPU film layer of said first TPU film is flame laminated to said foam interlayer.

24. The ventilated vehicle seat as set forth in claim 23, said scrim backing layer in contact with said low melt temperature TPU film layer of said first TPU film; and wherein at least a portion of said low melt temperature TPU film layer of said first TPU film melts during said compression molding to adhere said scrim backing layer to said high melt temperature TPU film layer of said first TPU film.

25. A method of forming a 3-dimensional ventilated trim cover for a vehicle seat, said method comprising:

forming a stacked assembly of an upper textile layer, an air permeable thermo-moldable foam interlayer, a first thermoplastic polyurethane (TPU) film, and a scrim backing layer, said air permeable thermo-moldable foam interlayer compression moldable with a compressive force in a range of about 150 psi to about 250 psi and a temperature in a range of about 104° C. to about 127° C., said upper textile layer comprising one or more of a fabric, perforated vinyl, and/or perforated leather, said scrim backing layer comprising a woven or non-woven textile, and said first TPU film including at least one air passageway through said first TPU film;
   placing said stacked assembly between a lower 3-dimensional mold tool and an upper 3-dimensional mold tool;
   lowering said upper 3-dimensional mold tool towards said lower 3-dimensional mold tool and applying compressive pressure in a range of about 150 psi and 250 psi on said stacked assembly to compression mold said stacked assembly;
   heating at least a portion of one or more of said mold tools to a temperature range of about 65° C. to about 160° C. for about 90 seconds to about 10 minutes to form said 3-dimensional ventilated trim cover from said stacked assembly;
   removing said upper 3-dimensional mold tool from said formed 3-dimensional ventilated trim cover; and
   removing said formed 3-dimensional trim cover from said lower 3-dimensional mold tool.

26. The method as set forth in claim 25, said method comprising:
adhering said upper textile layer to an upper side of said foam interlayer with one of a one-part urethane adhesive, a two-part urethane adhesive, or flame lamination.

27. The method as set forth in claim 26, said method comprising:
adhering said scrim backing layer to a lower side of said first TPU film.

28. The method as set forth in claim 27, said method comprising:
adhering said first TPU film to a lower side of said foam interlayer with one of a one-part urethane adhesive, a two-part urethane adhesive, or flame lamination.

29. The method as set forth in claim 25, said method comprising:
flame laminating said first TPU film to said foam interlayer, said first TPU film having a low melt temperature TPU film layer and a high melt temperature TPU film layer, said low melt temperature TPU film layer having a melting point in a temperature range of about 60° C. to about 120° C. and said high melt temperature TPU film layer having a melting point in a temperature range of about 120° C. to about 150° C.;
stacking said foam interlayer flame laminated to said first TPU film with said scrim backing layer such that said low melt temperature TPU film layer of said first TPU film is adjacent said scrim backing layer; and
melting said low melt temperature TPU film layer of said first TPU film to bond said scrim backing layer to said high melt temperature TPU film layer of said first TPU film during said compression molding said stacked assembly.

30. The method as set forth in claim 25, said method comprising:
flame laminating a plus foam pad to said upper textile layer;
flame laminating said plus foam pad to a second TPU film, said second TPU film having a low melt temperature TPU film layer and a high melt temperature TPU film layer, said low melt temperature TPU film layer having a melting point in a temperature range of about 60° C. to about 120° C. and said high melt temperature TPU film layer having a melting point in a temperature range of about 120° C. to about 150° C., and said second TPU film having air passageways through said second TPU film;
stacking said upper textile layer, said plus foam pad, and said second TPU film with said foam interlayer such that said low melt temperature TPU film layer of said second TPU film is adjacent said foam interlayer; and
melting said low melt temperature TPU film layer of said second TPU film to bond said foam interlayer to said high melt temperature TPU film layer of said second TPU film while compression molding said stacked assembly.

* * * * *